Figure 1:
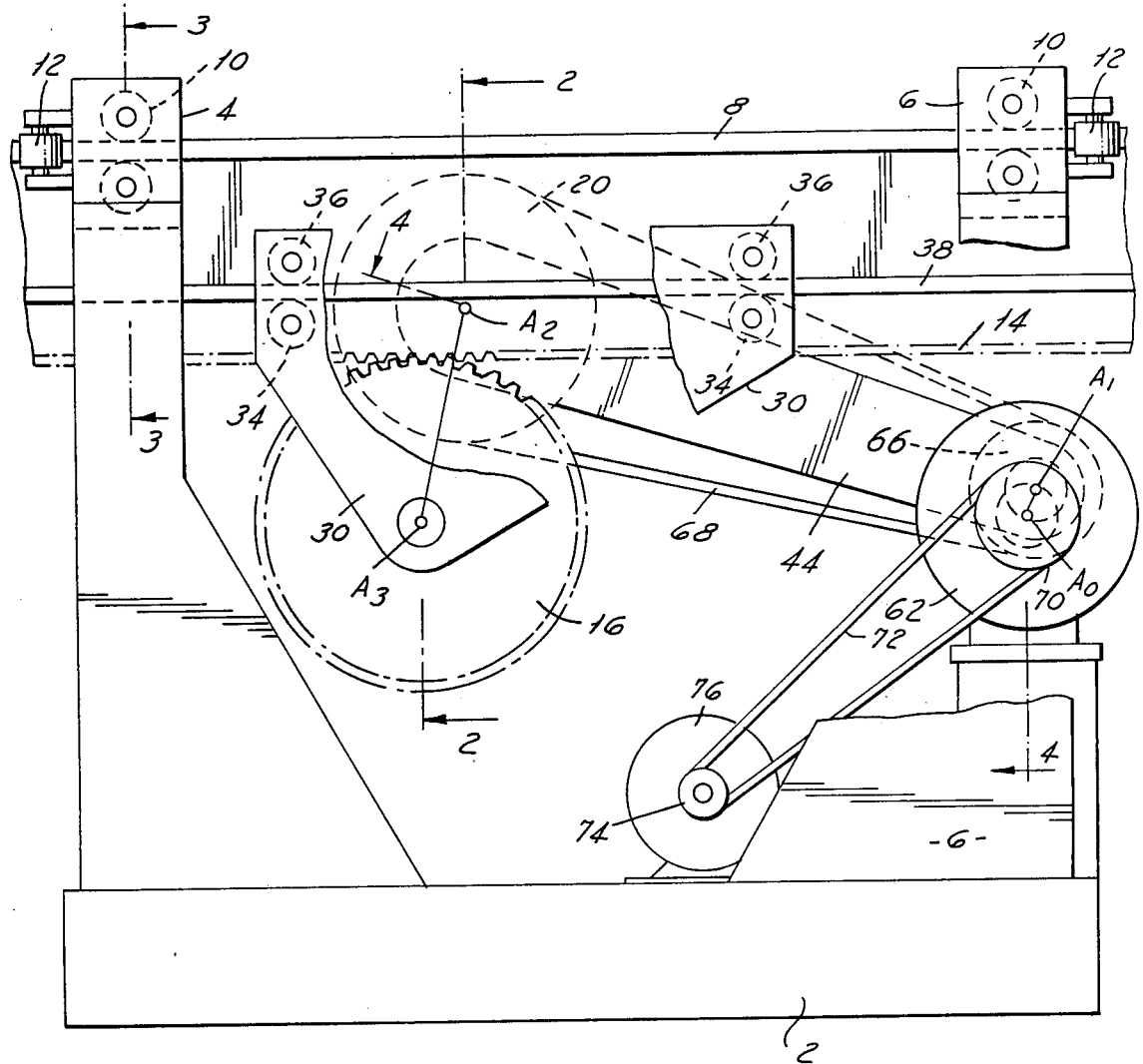

United States Patent [19]

Brems

[11] 4,075,911

[45] Feb. 28, 1978

[54] DRIVE MECHANISM FOR RECIPROCATING AND MULTIPLE STEP INDEX DEVICES

[76] Inventor: John Henry Brems, 32867 White Oaks Trail, Birmingham, Mich. 48010

[21] Appl. No.: 577,942

[22] Filed: May 15, 1975

Related U.S. Application Data

[63] Continuation-in-part of Ser. No. 444,024, Feb. 20, 1974, abandoned, and Ser. No. 474,947, May 31, 1974, abandoned.

[51] Int. Cl.² .............................................. B23B 29/24
[52] U.S. Cl. .................................................. 74/816
[58] Field of Search ................. 74/813, 814, 815, 816, 74/89.17, 29, 116

[56] References Cited

U.S. PATENT DOCUMENTS

| | | | |
|---|---|---|---|
| 1,798,780 | 3/1931 | Bowlus | 74/41 UX |
| 2,153,094 | 4/1939 | Maier | 74/41 |
| 2,526,561 | 10/1950 | Keltner | 74/41 |
| 2,628,765 | 2/1953 | Anderson | 74/570 |
| 3,542,186 | 11/1970 | Allen | 198/766 |
| 3,776,351 | 12/1973 | Erb | 74/570 |
| 3,789,676 | 2/1974 | Brems | 74/29 |
| 3,817,370 | 6/1974 | Cox | 198/766 |

*Primary Examiner*—Benjamin W. Wyche
*Assistant Examiner*—Wesley S. Ratliff, Jr.
*Attorney, Agent, or Firm*—Barnes, Kisselle, Raisch & Choate

[57] ABSTRACT

A drive mechanism for a reciprocating and multiple step index mechanism to achieve smooth starting and stopping action with controlled acceleration and deleration. It is characterized by extremely flexible kinematic characteristics achieved by the superposition of a constant velocity, fundamental and a higher harmonic component. The mechanism utilizes pairs of rotating drive members and eccentric members mounted in non-rotational relation, the pairs being connected to rotate in a multiple integral angular velocity ratio. An output member is arranged in driving relation to one of the eccentric members and is influenced also by the rotation of the other eccentric member. Power input is directed to one of the pairs of drive members.

16 Claims, 65 Drawing Figures

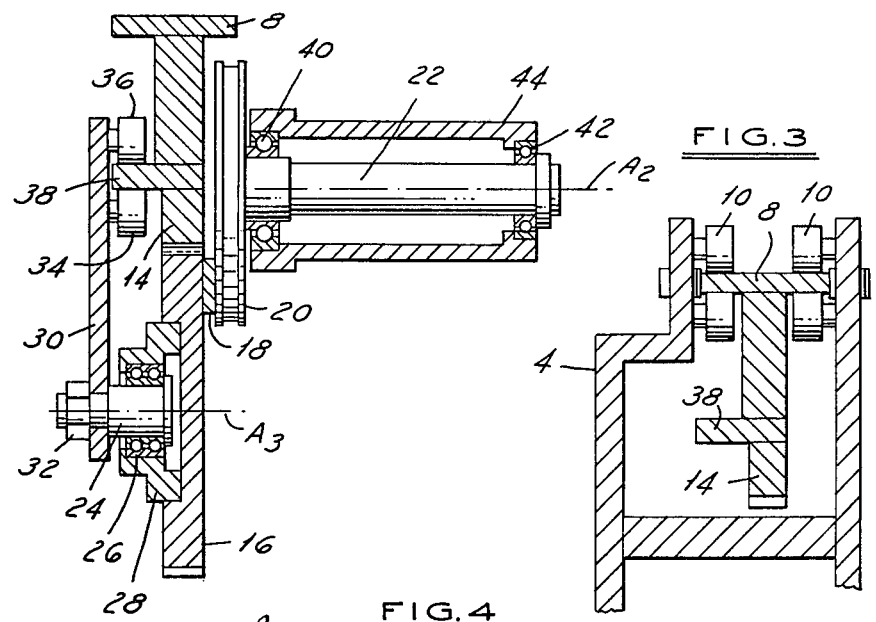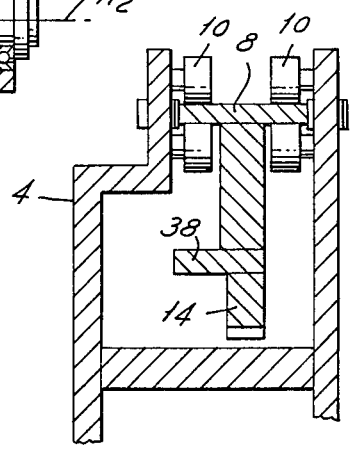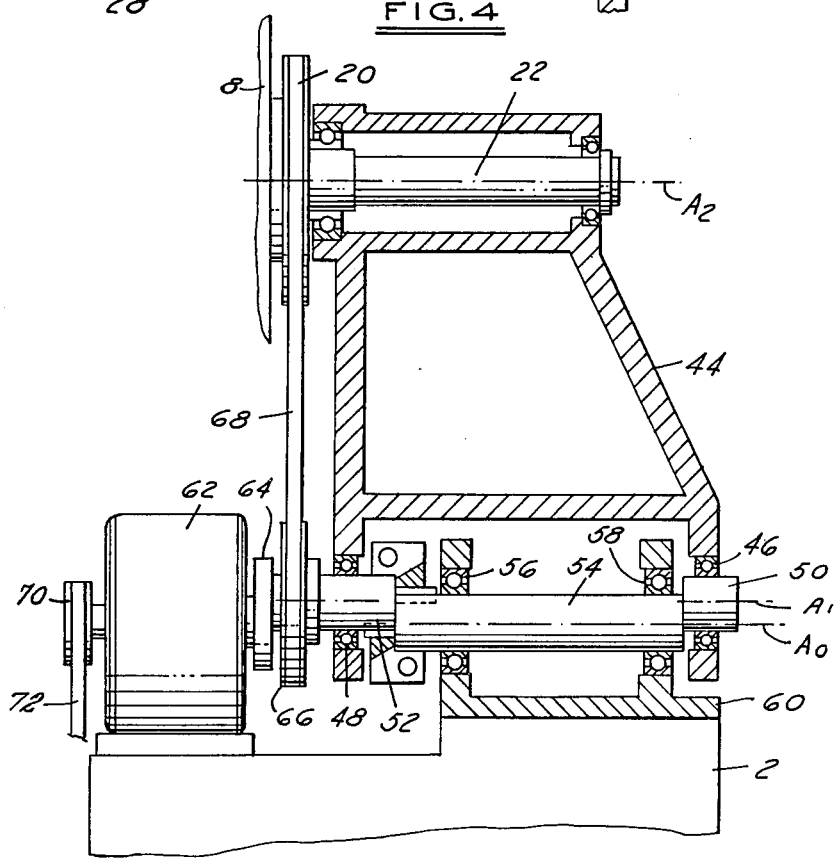

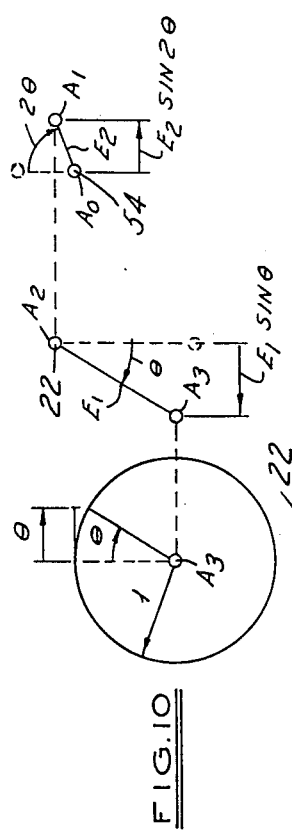
FIG.10
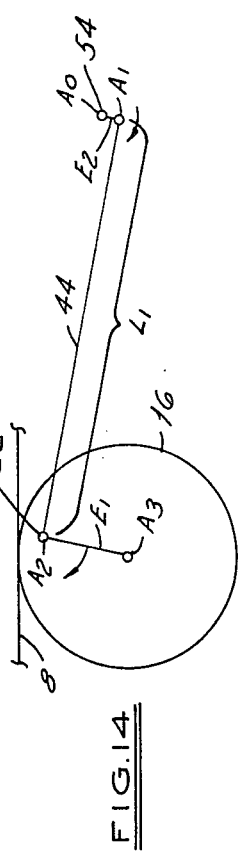
FIG.14
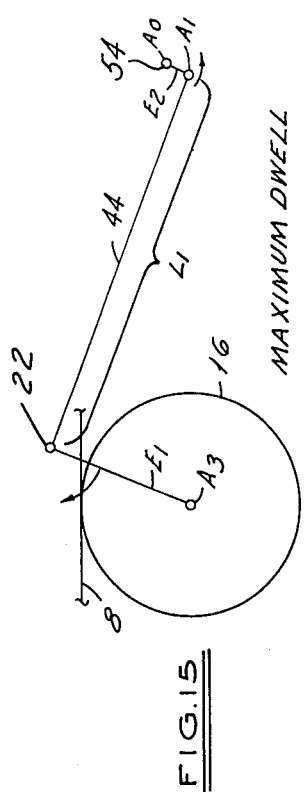
MAXIMUM DWELL
FIG.15
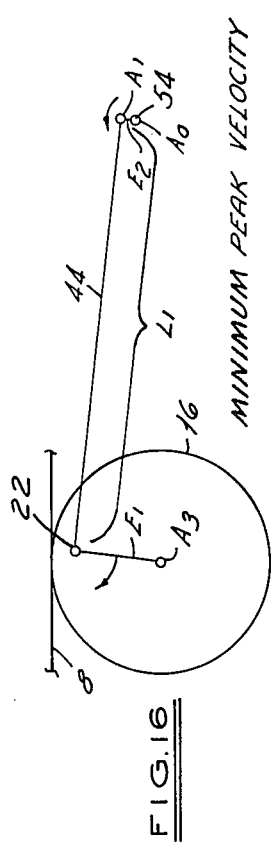
MINIMUM PEAK VELOCITY
FIG.16
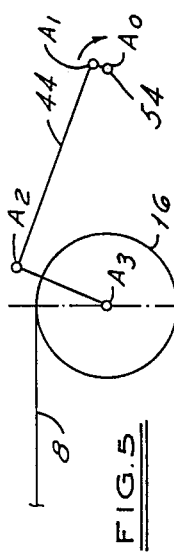
FIG.5
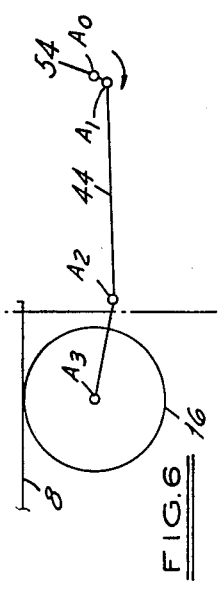
FIG.6
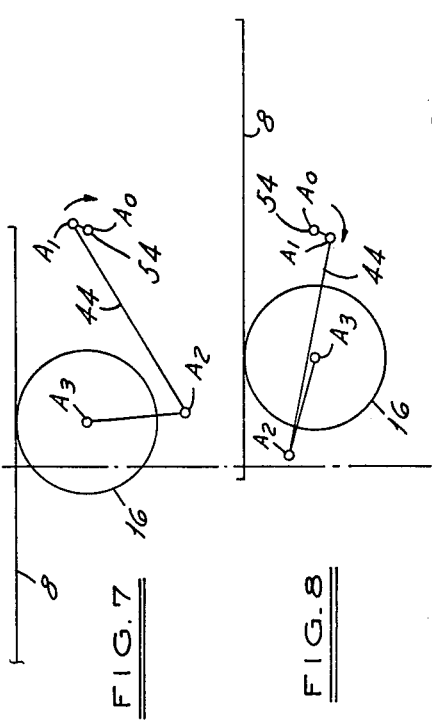
FIG.7
FIG.8
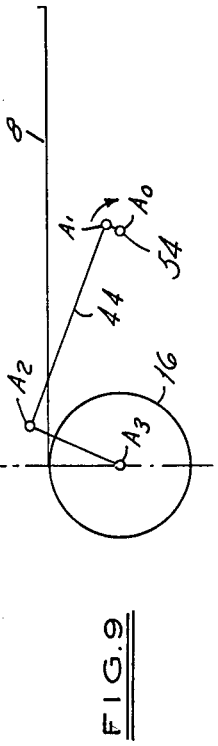
FIG.9

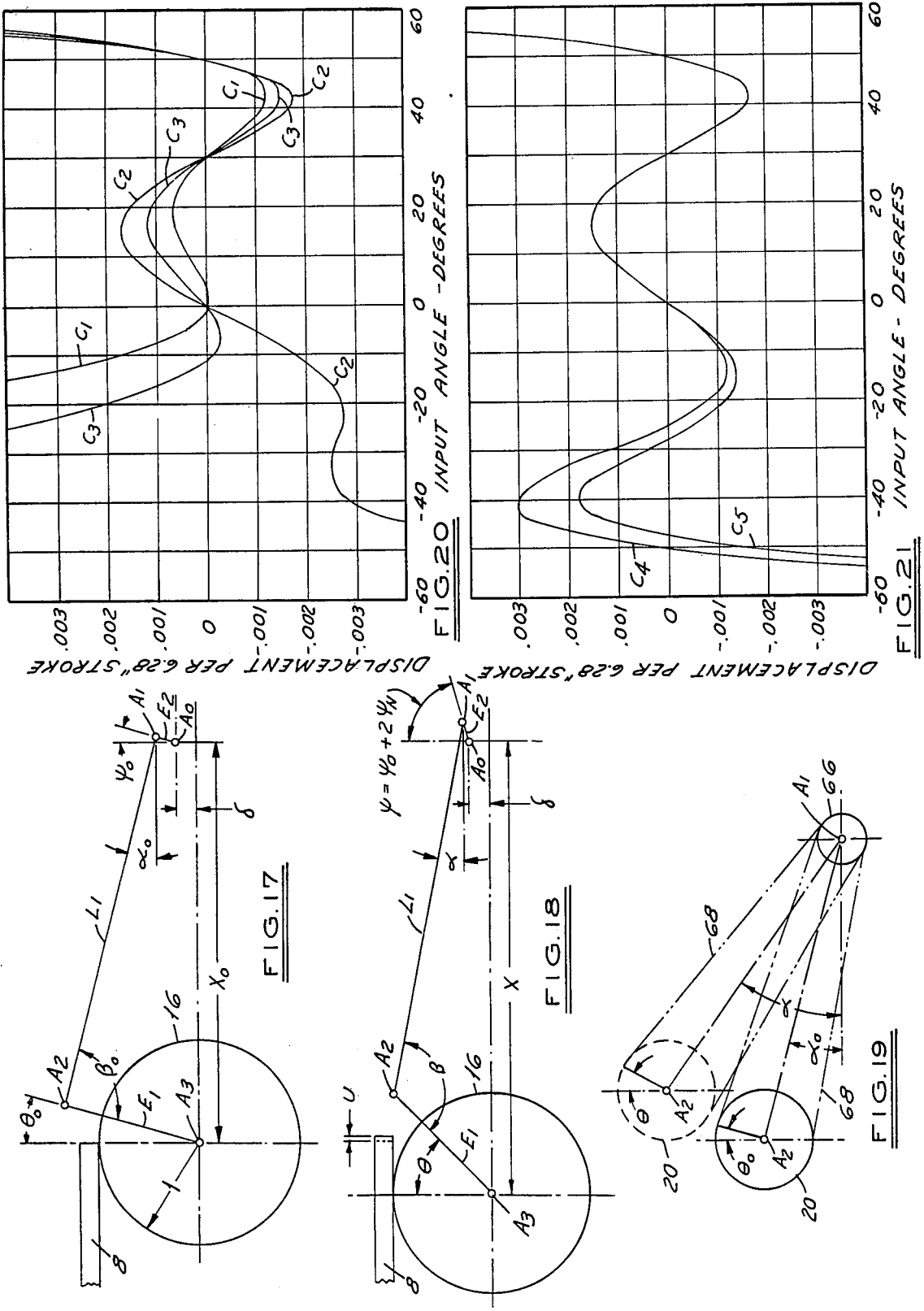

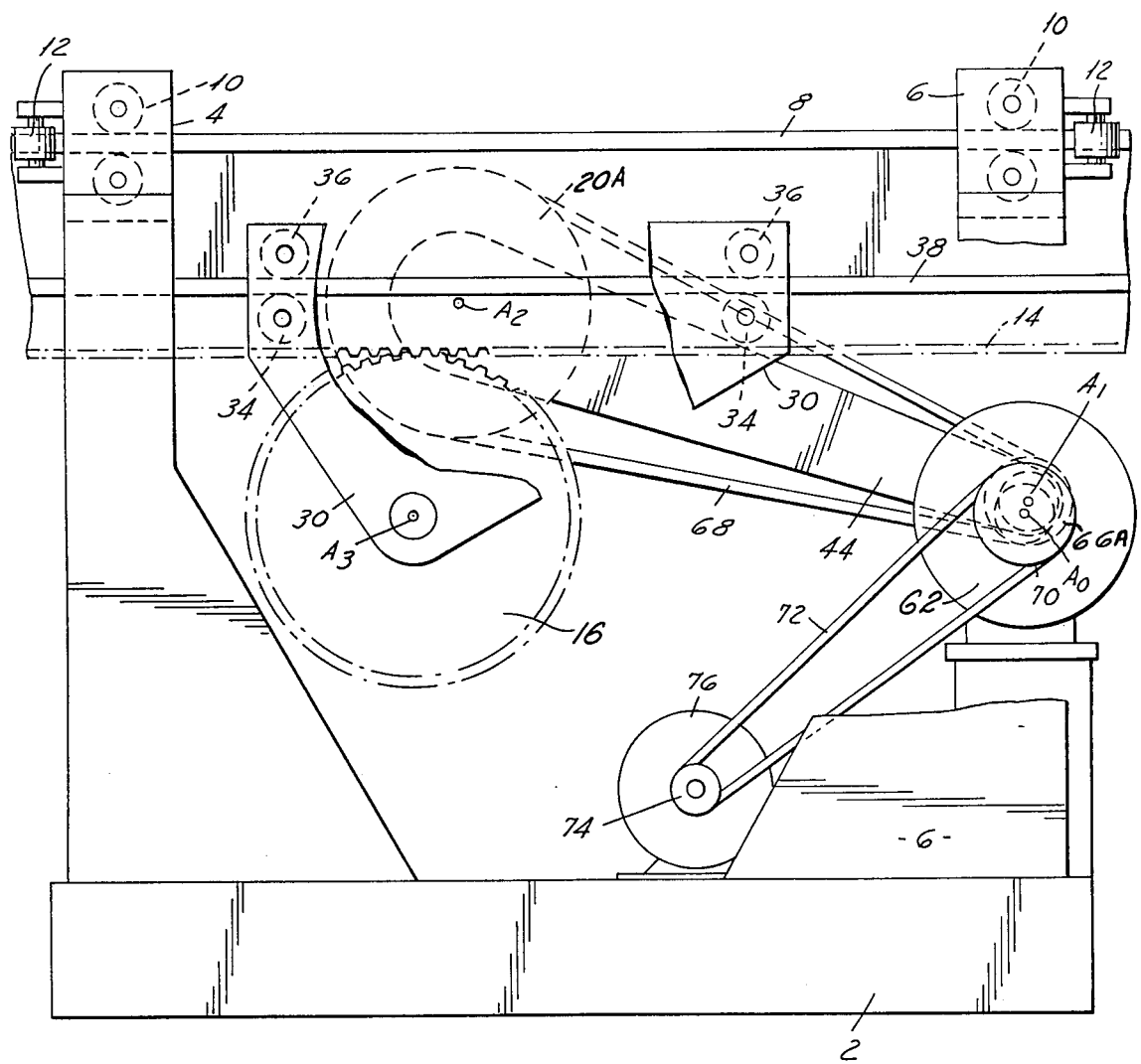

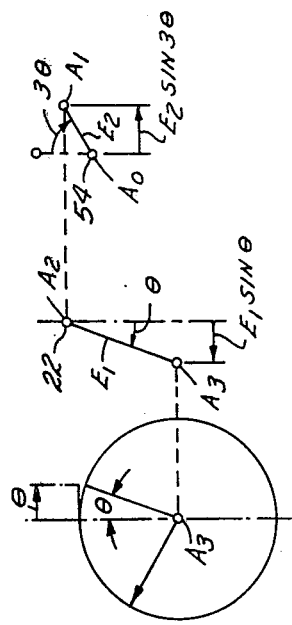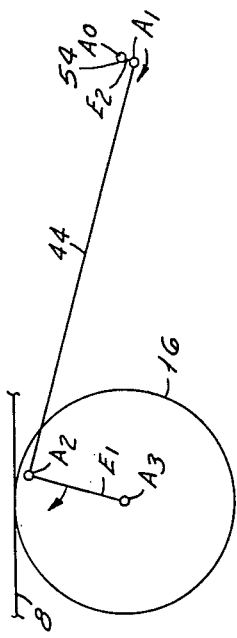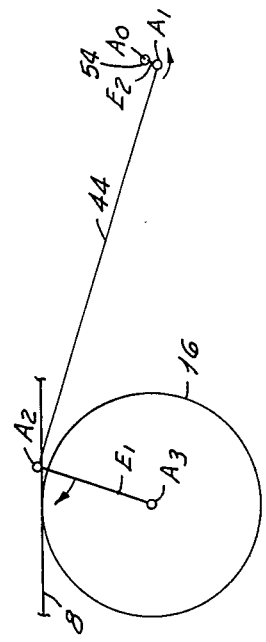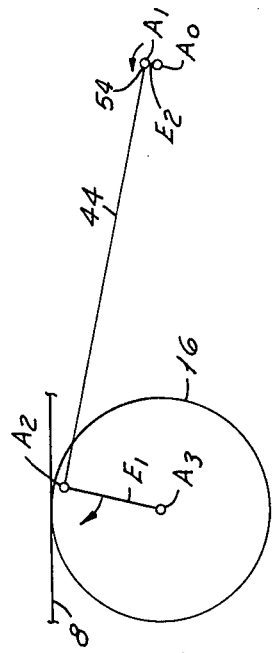
FIG.28　　FIG.32　　FIG.33　　FIG.34
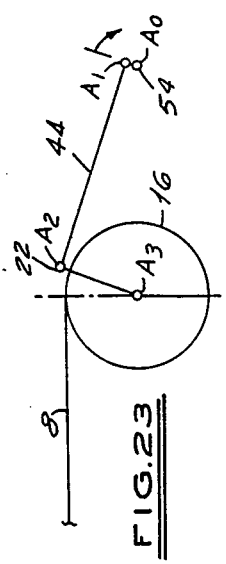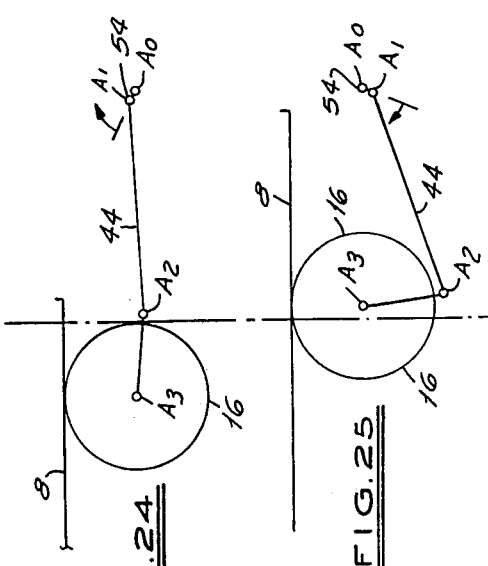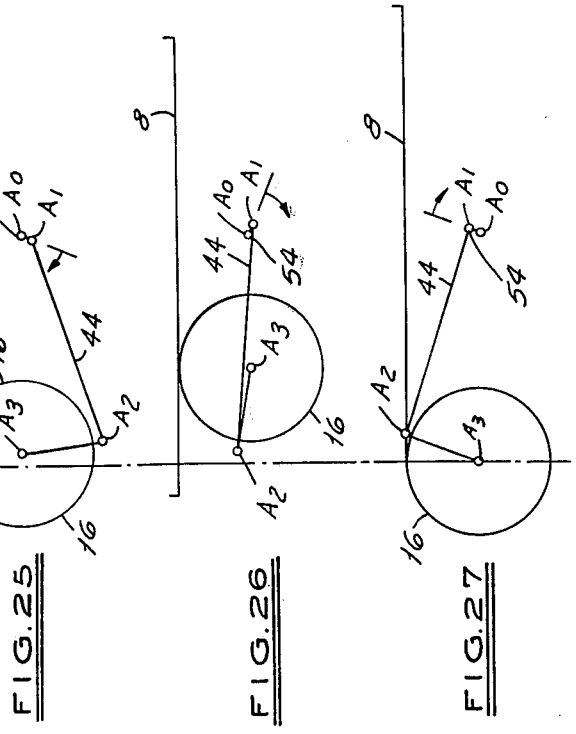
FIG.23　　FIG.24　　FIG.25　　FIG.26　　FIG.27

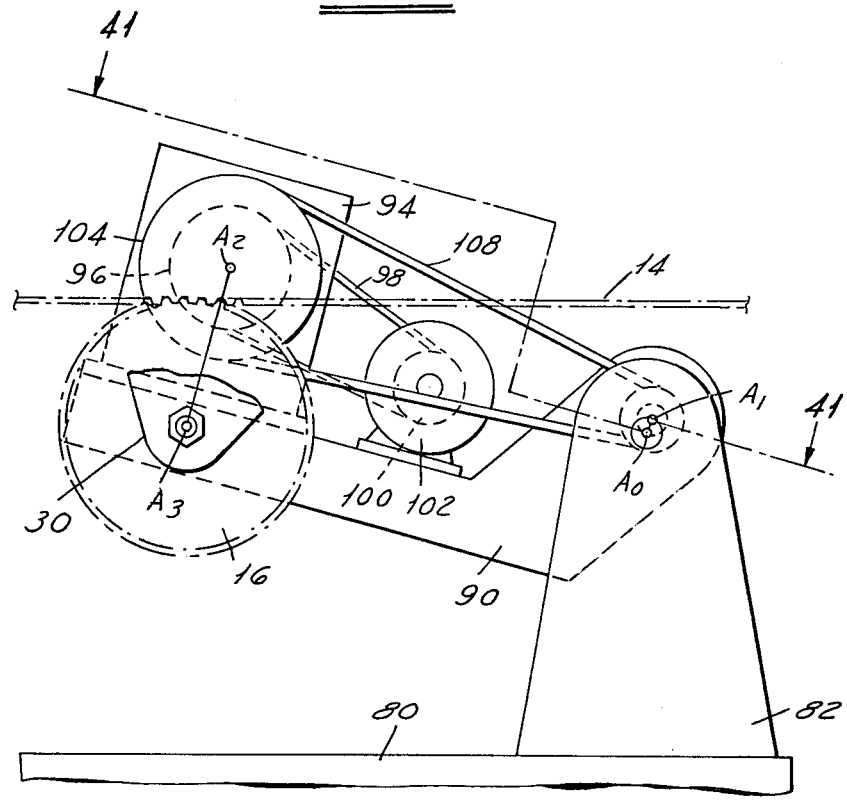
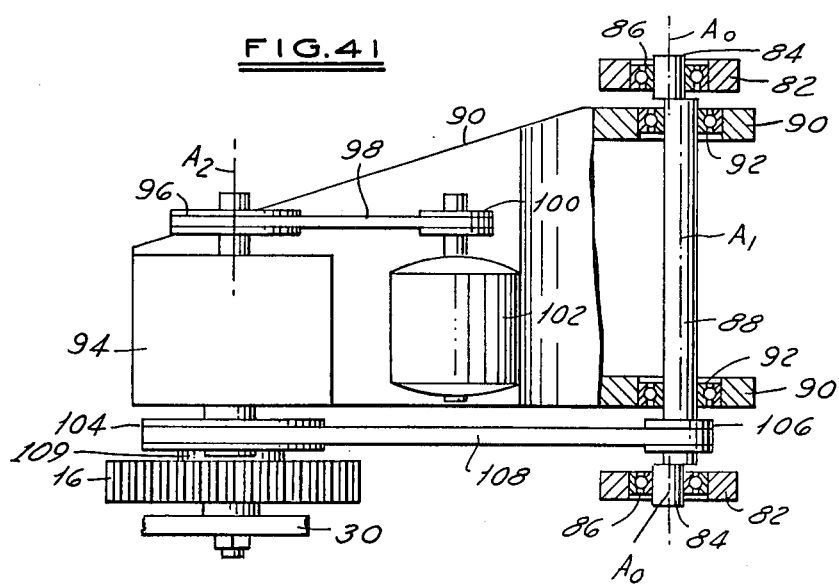

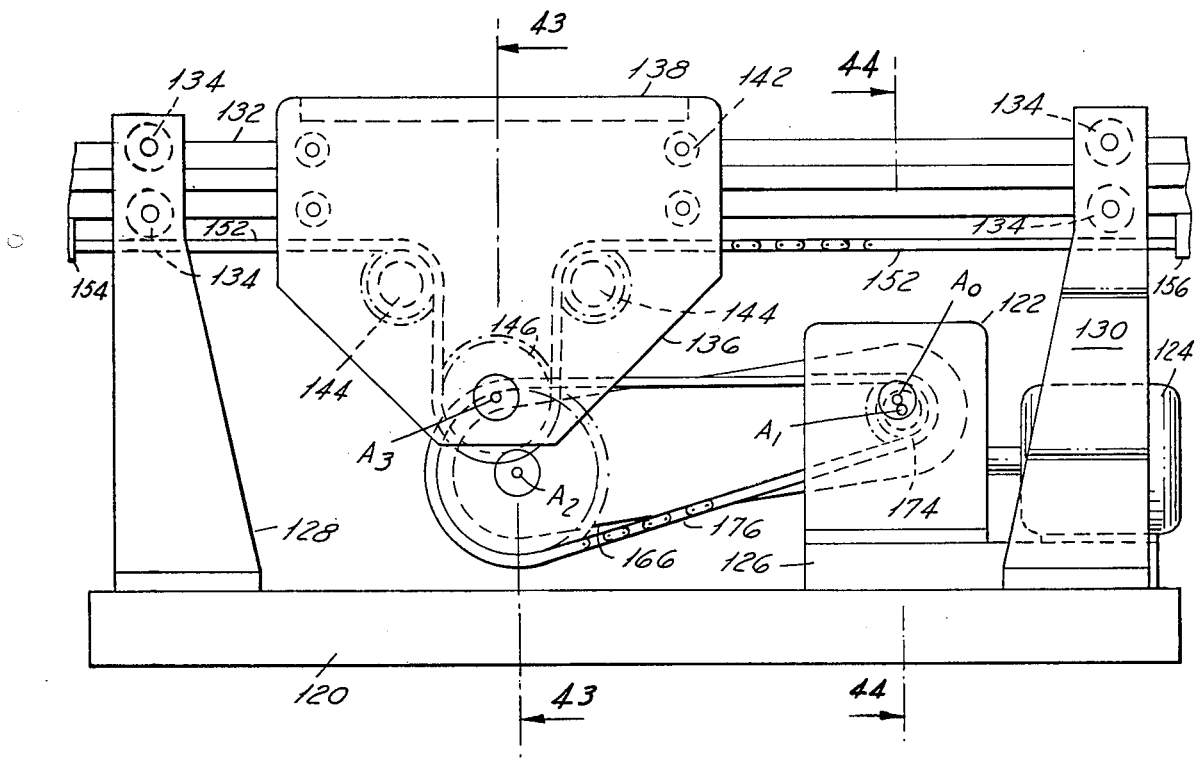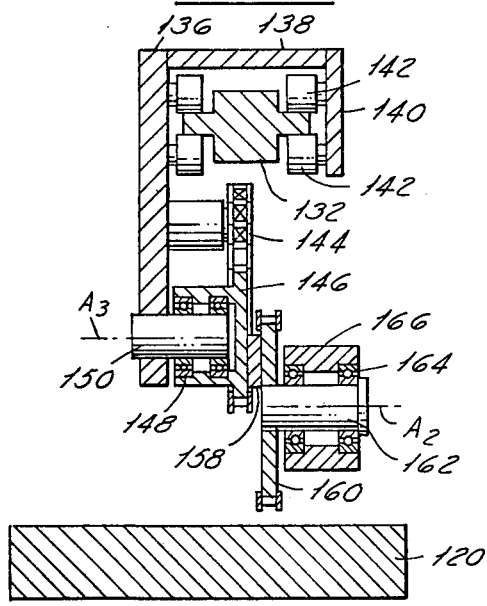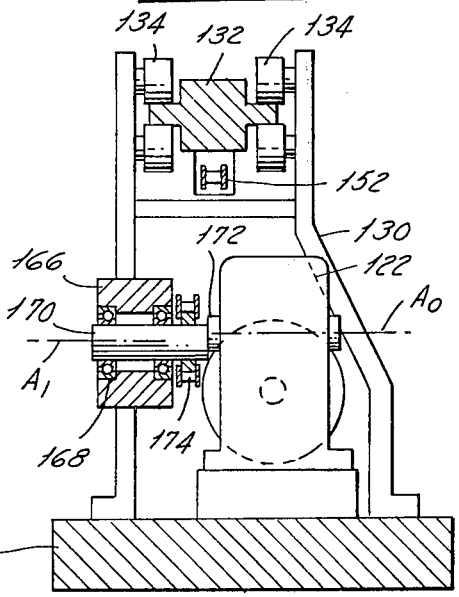

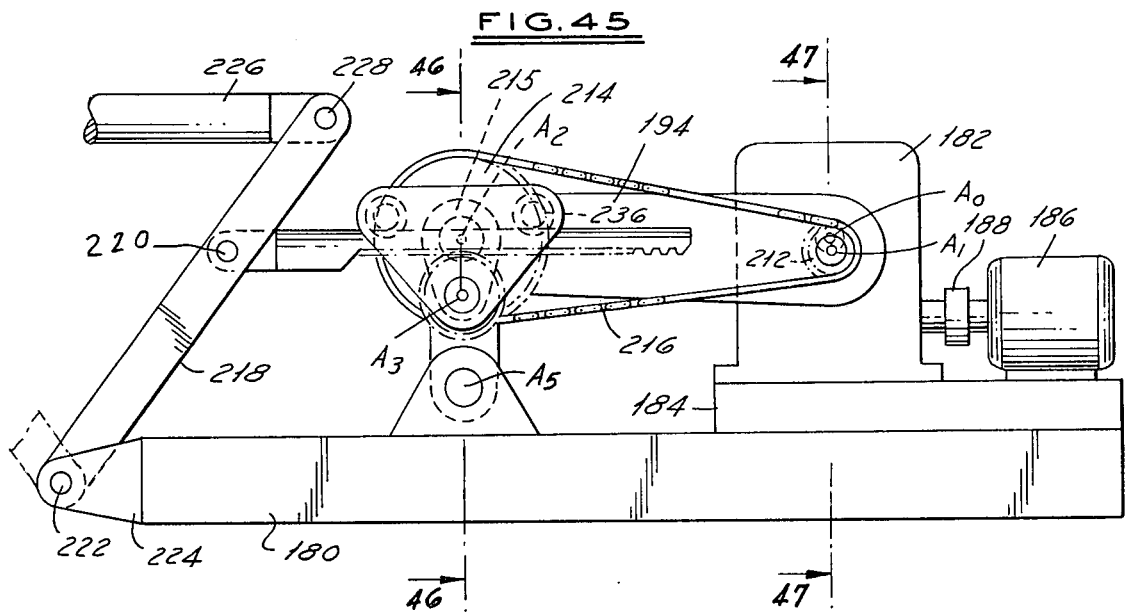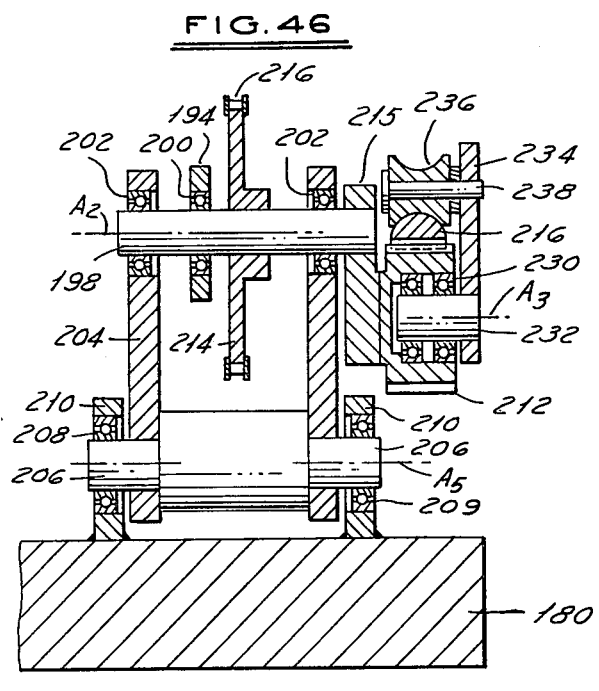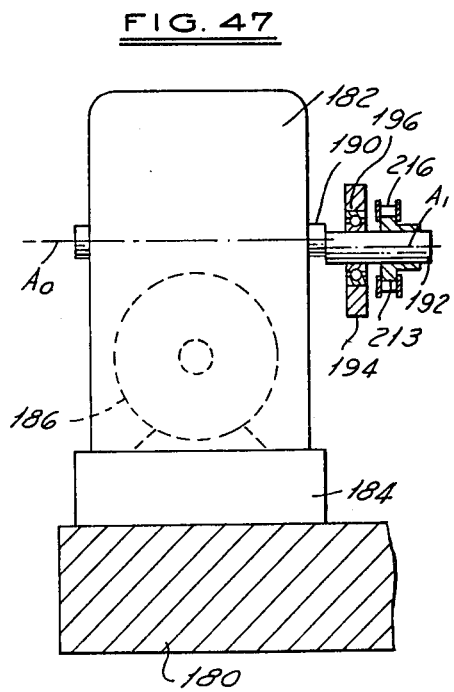

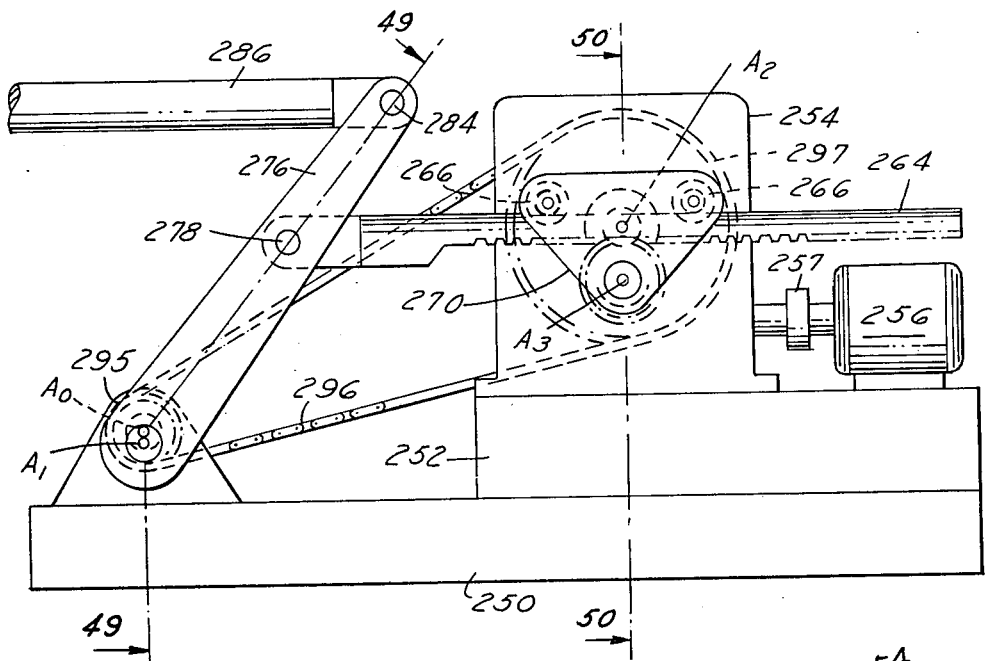
FIG. 48
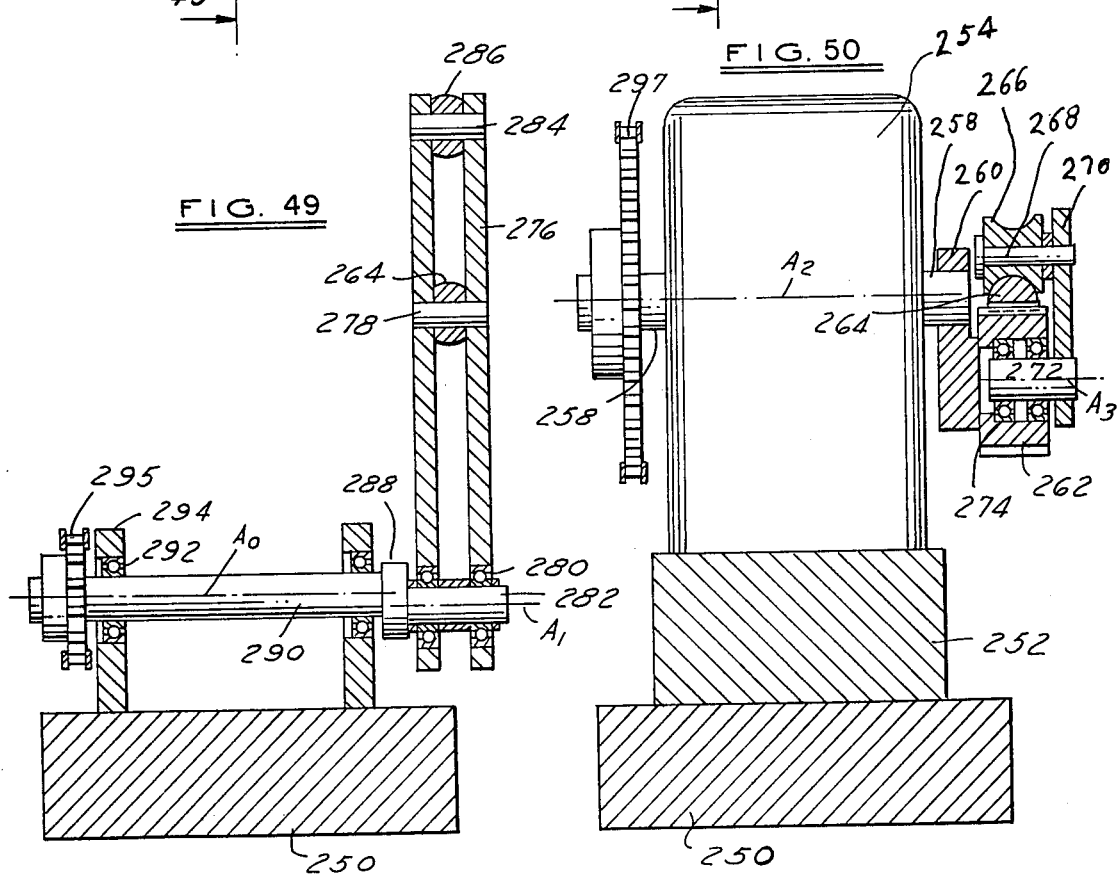
FIG. 49
FIG. 50

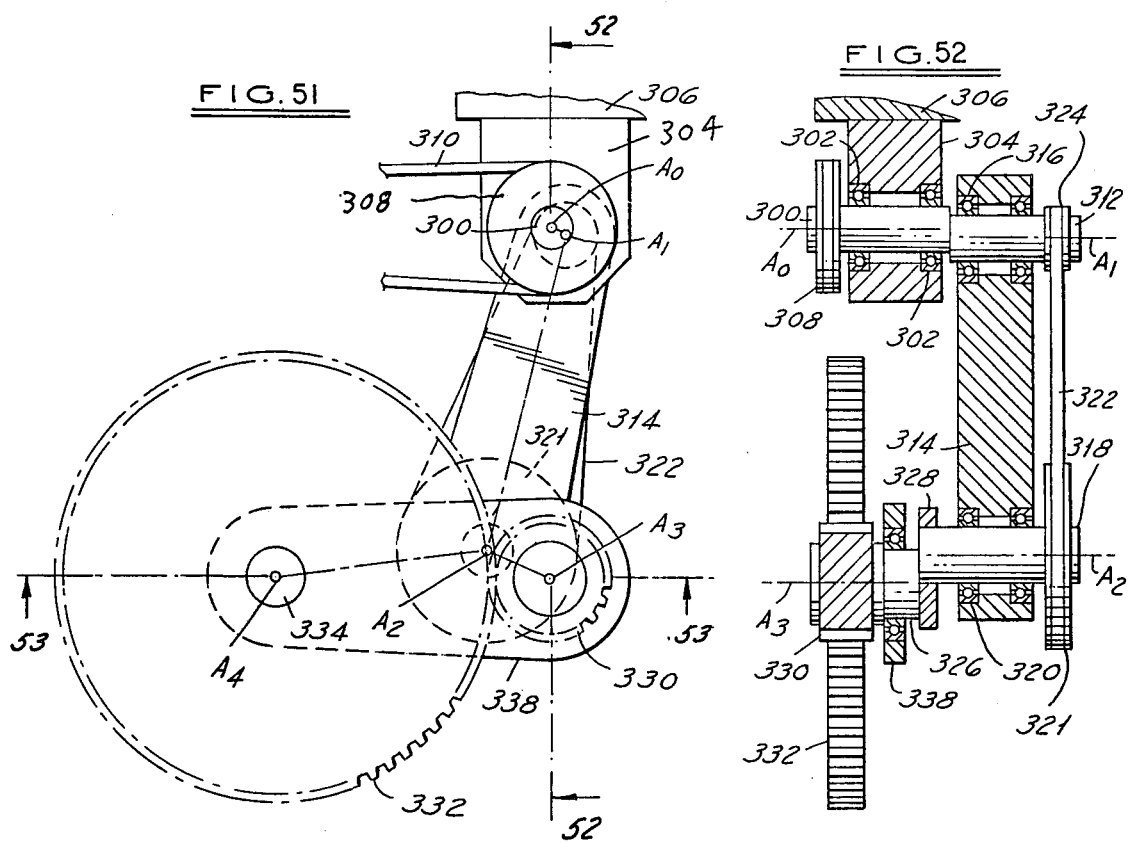
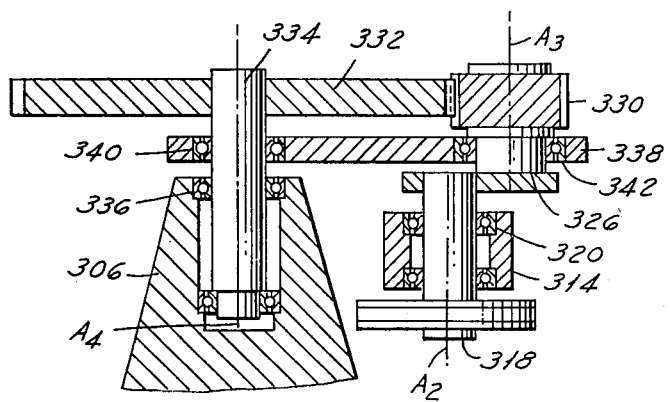

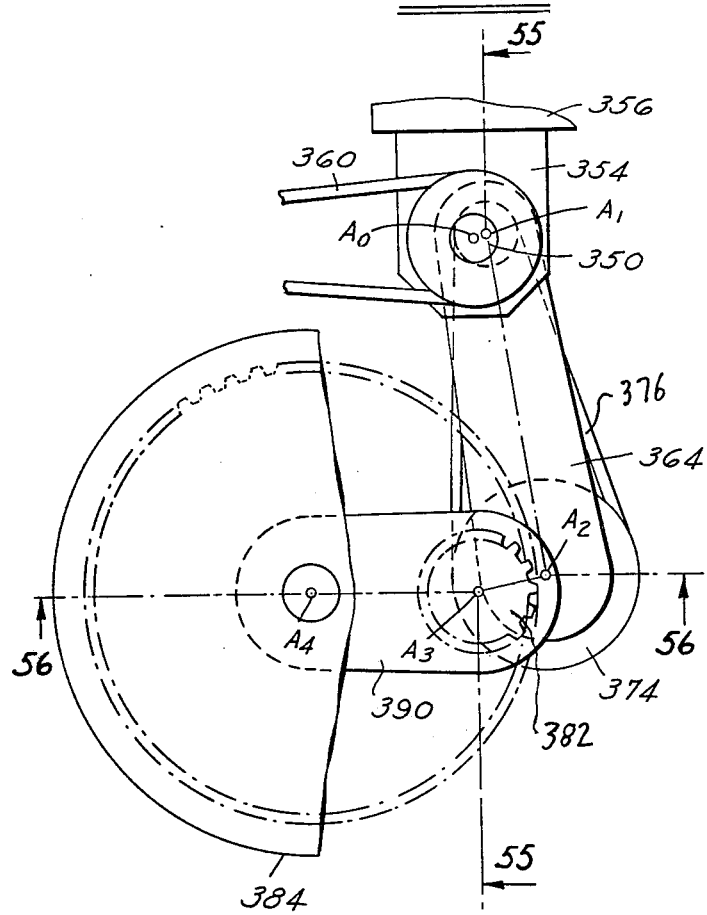
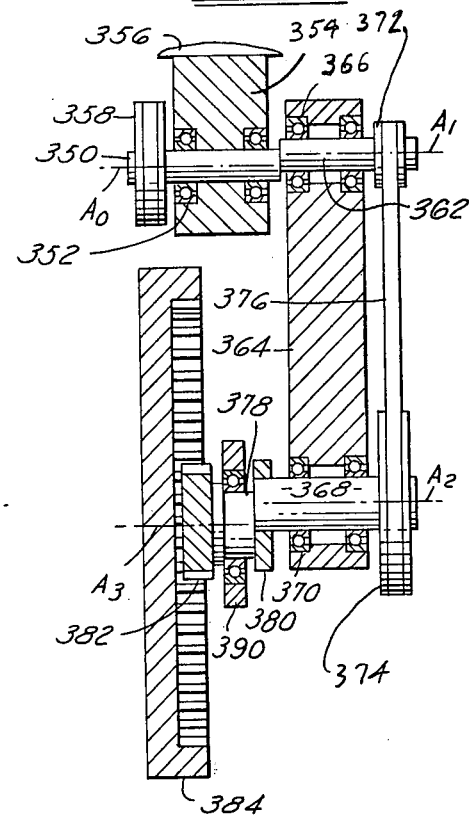
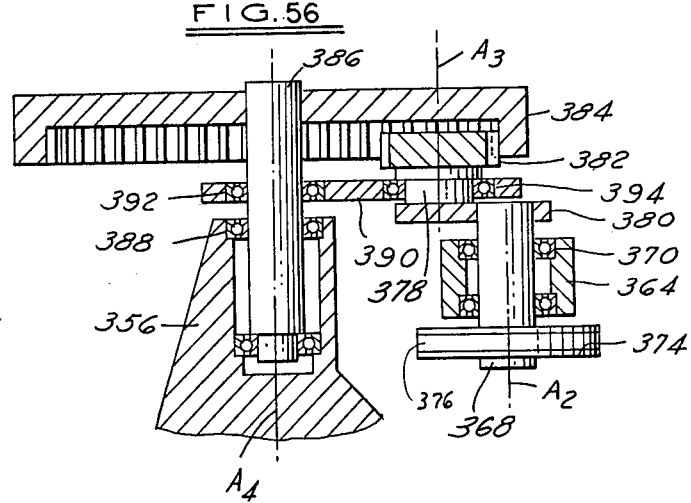

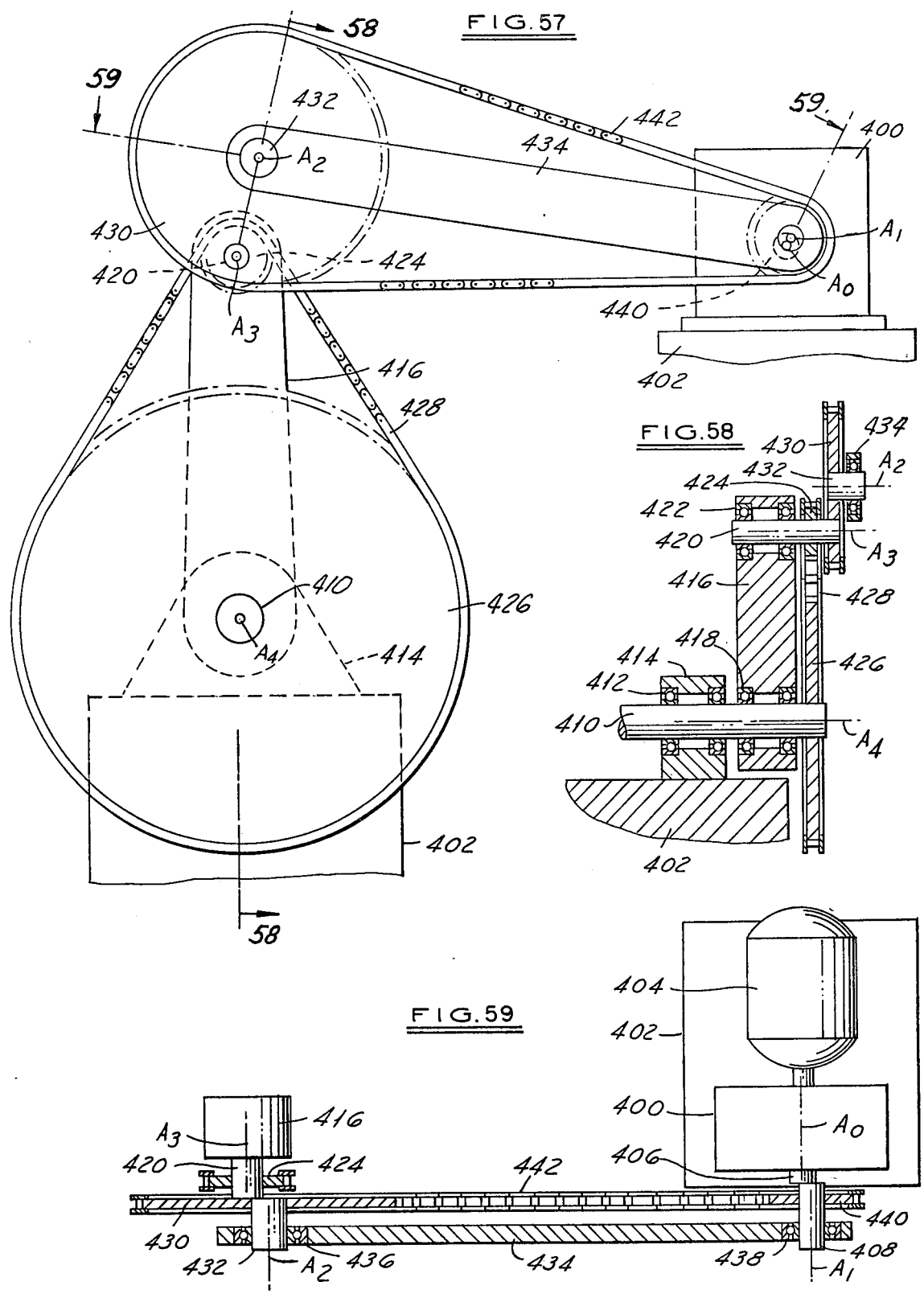

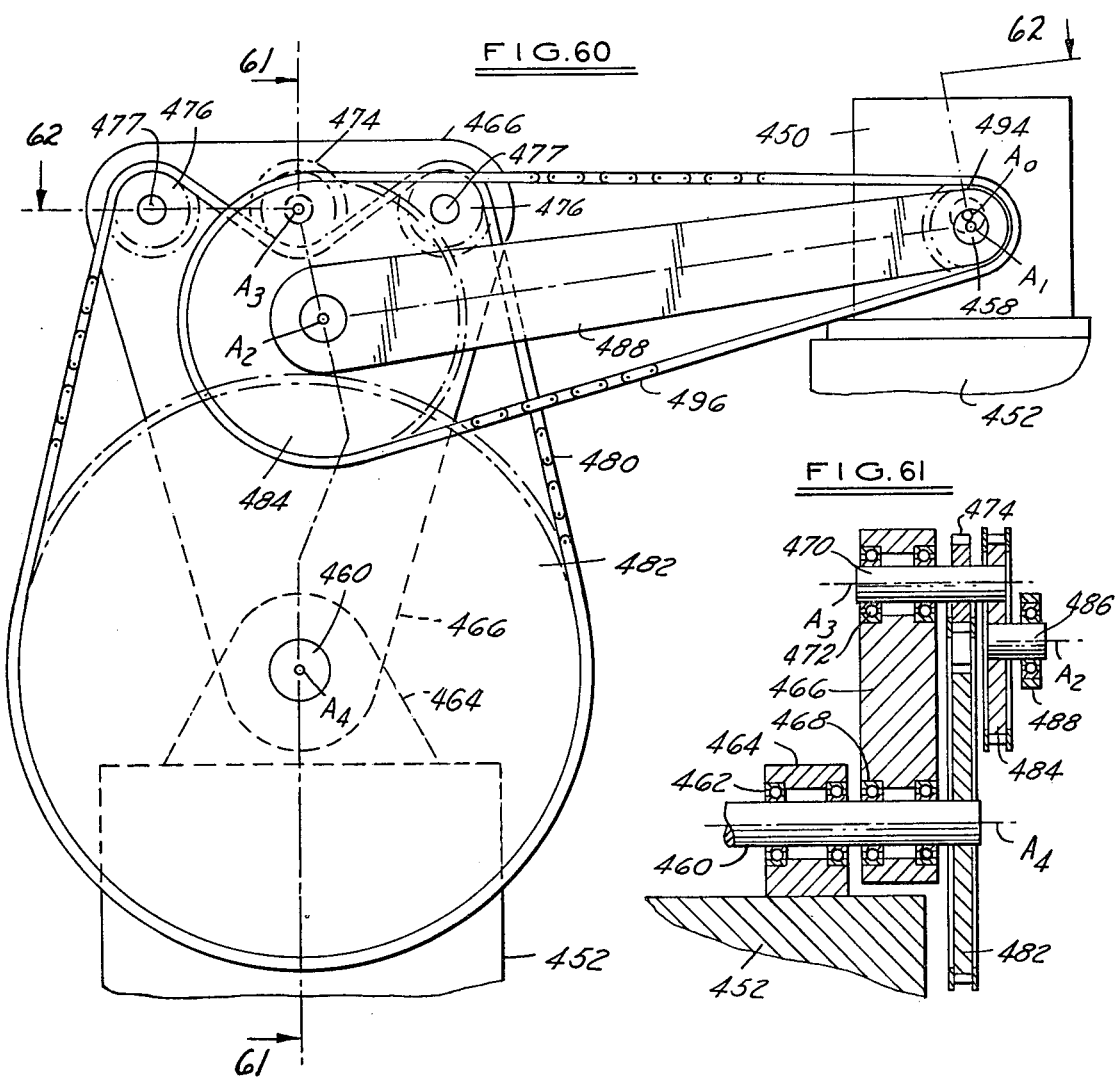
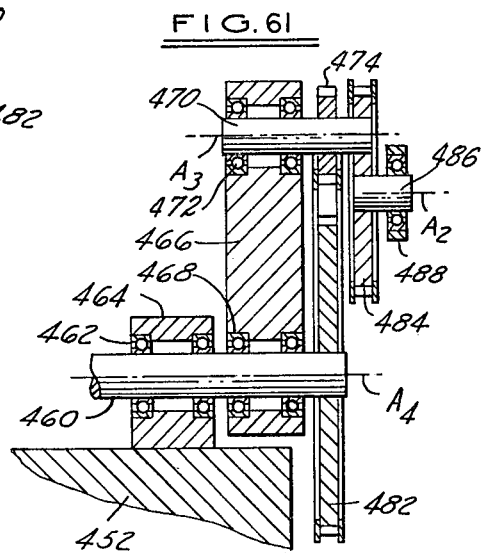
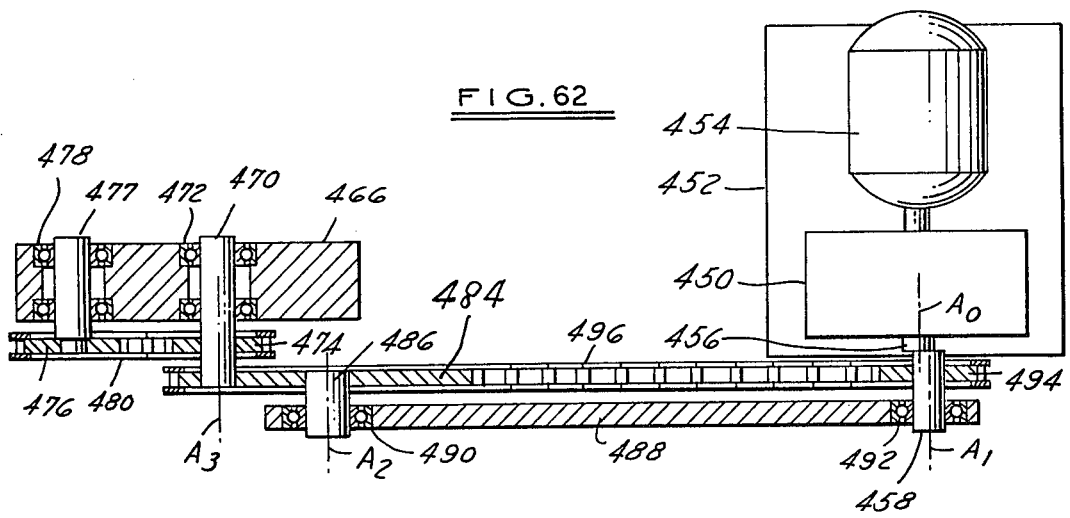

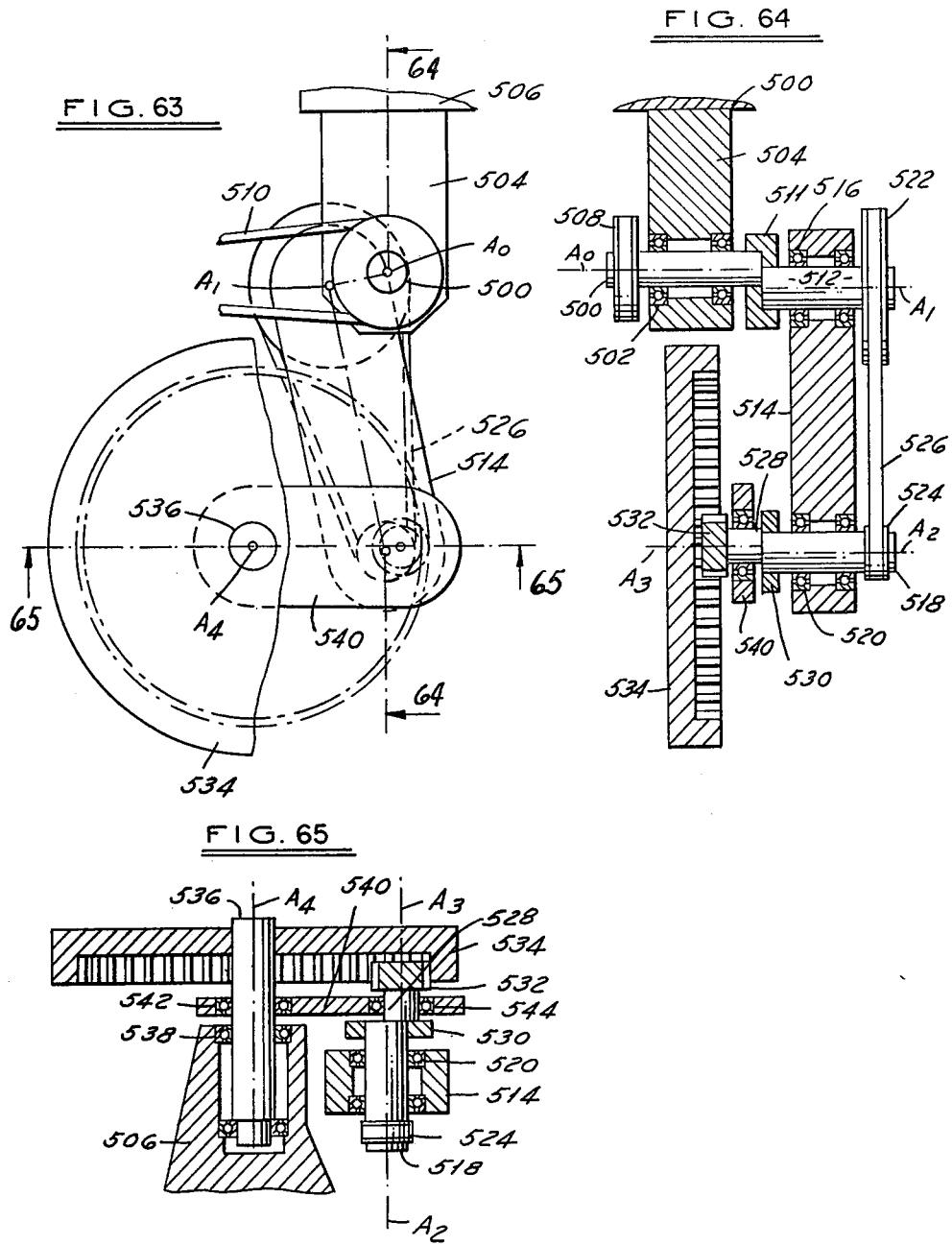

DRIVE MECHANISM FOR RECIPROCATING AND MULTIPLE STEP INDEX DEVICES

This application is a continuation-in-part of my co-pending applications, Ser. No. 444,024, filed Feb. 20, 1974, now abandoned, and Ser. No. 474,947, filed May 31, 1974, now abandoned, both entitled "Drive Mechanism for Reciprocating and Multiple Step Index Devices."

This invention relates to a Drive Mechanism for Reciprocating and Multiple Step Index Devices.

It is an object of this invention to provide a smooth shock free starting and stopping action for a reciprocating or multiple indexing table which has a defined straight path of travel or defined curvilinear motion.

It is a further object to provide a mechanical accelerating and declerating mechanism which is adaptable to various strokes or indexing steps depending on the particular length desired.

Another object of the invention is to provide a drive mechanism which by its nature makes it possible easily to add a higher harmonic motion component to create a superimposed oscillation at an integral multiple of the basic indexing motion, thereby generating extremely long dwells at the ends of the indexing motion, or with different phasing, to generate movement characteristics in which the peak velocities or peak accelerations reached during indexing are appreciable less than with other indexing systems operating under similar conditions.

It is a still further object to provide a mechanism which can provide a very wide range of symmetrical or non-symmetrical kinematic characteristics through manipulation of the magnitude and phase angle of a higher harmonic component.

Other objects and features of the invention will be apparent in the following description and claims in which the best modes of the invention are set forth together with the principles of operation.

Drawings accompany the disclosure and the various views thereof are briefly described as follows:

FIG. 1, a side view of a mechanism constructed in accordance with the invention for achieving a reciprocating drive utilizing second harmonic addition.

FIG. 2, a sectional view on line 2—2 of FIG. 1.

FIG. 3, a sectional view on line 3—3 of FIG. 1.

FIG. 4, an end view of the mechanism illustrated in FIG. 1.

FIGS. 5 to 9, various views showing diagrammatically different positions of the fundamental elements of the mechanism of FIG. 1.

FIG. 10, an exploded view of the various components of the mechanim useful for a mathematical analysis of the operation of a second harmonic system.

Figure 11:
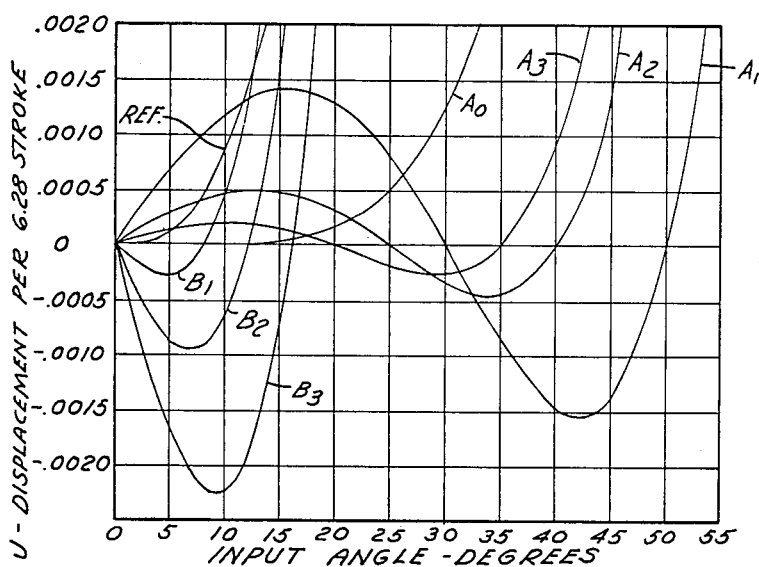
Figure 12:
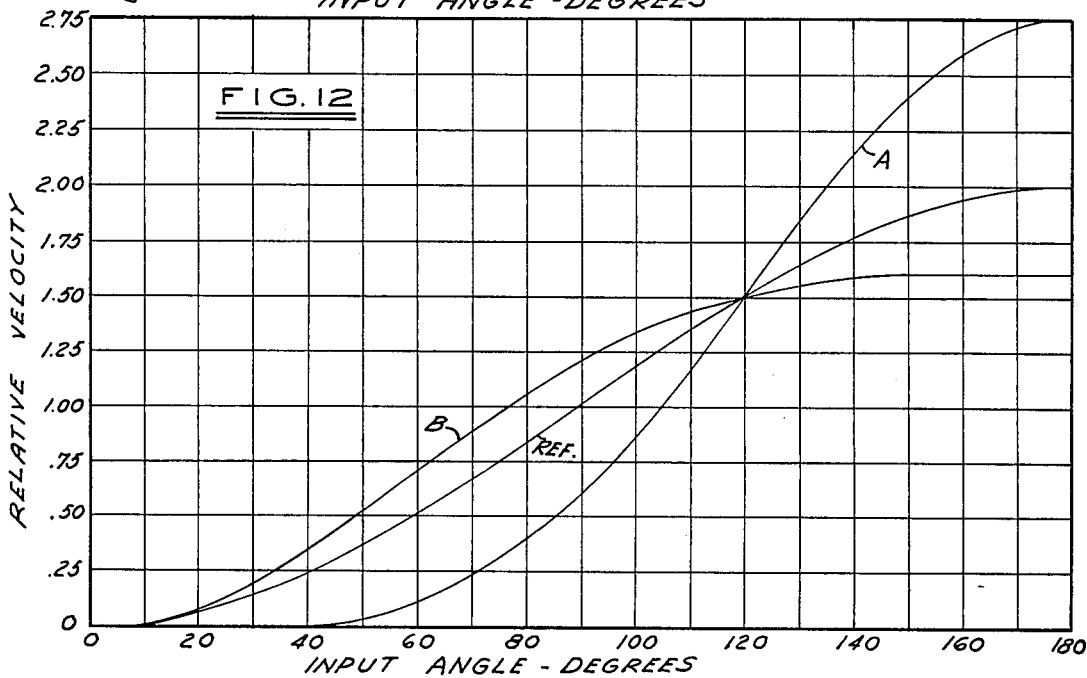
Figure 13:
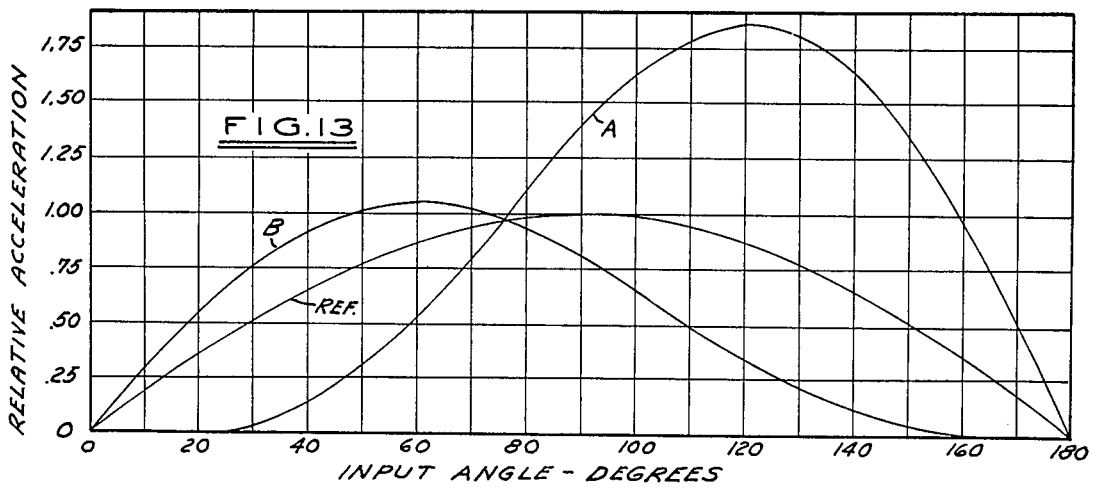

FIGS. 11, 12, 13 depict curves showing, respectively, the displacement, relative velocity, and relative acceleration of representative cycles of a mechanism incorporating second harmonic addition.

FIGS. 14, 15, 16, diagrammatic views illustrating modified versions relating to center of dwell positions of second harmonic addition systems.

FIGS. 17 and 18, diagrammatic views of a mechanism relating to mathematical analysis of second harmonic systems.

FIG. 19, a diagrammatic view illustrating the effect of a change in the angle $\alpha$.

FIGS. 20 and 21, illustrations of the displacement curves for various variable combinations.

FIG. 22, a side view of a mechanism constructed in accordance with the invention for achieving a reciprocating drive utilizing third harmonic addition.

FIGS. 23 to 27, various views showing diagrammatically different positions of the fundamental elements of the mechanism of FIG. 22.

FIG. 28, an exploded view of the various components of the mechanism useful for a mathematical analysis of the operation of a third harmonic system.

Figure 29:
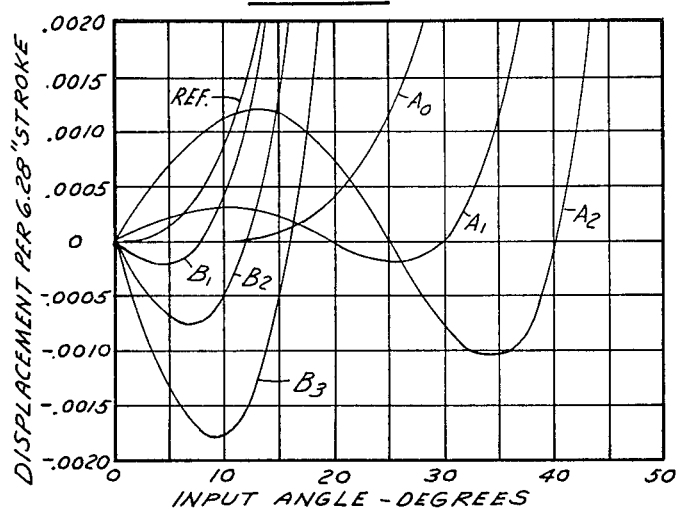
Figure 30:
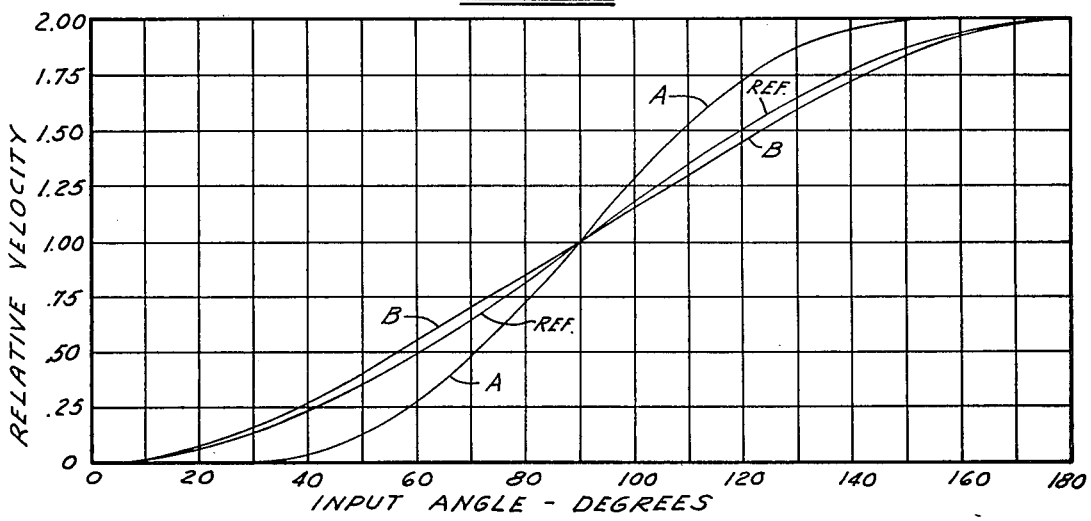
Figure 31:
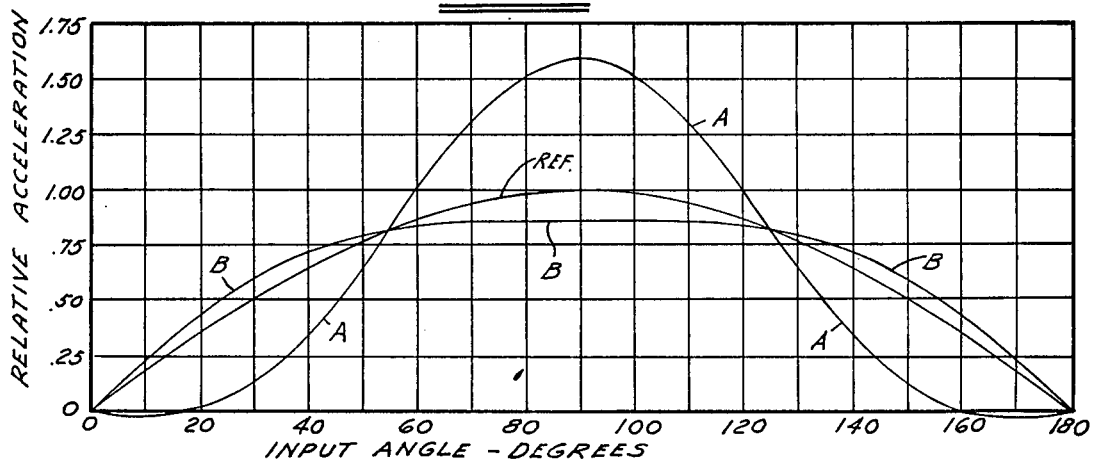

FIGS. 29, 30, 31 depict curves showing, respectively, the displacement, relative velocity, and relative acceleration of representative cycles of a mechanism incorporating third harmonic addition.

FIGS. 32, 33, 34, diagrammatic views illustrating modified versions relating to center of dwell positions of third harmonic addition systems.

Figure 35:
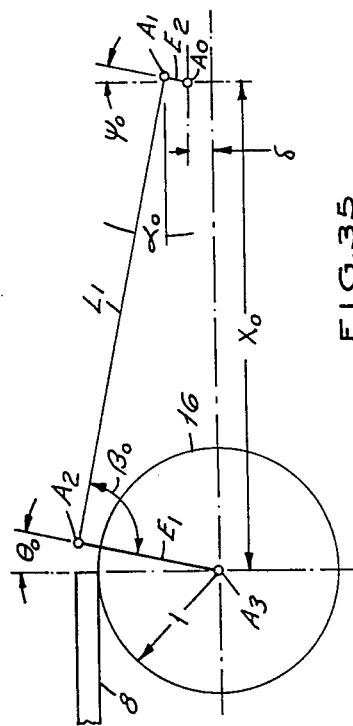
Figure 36:
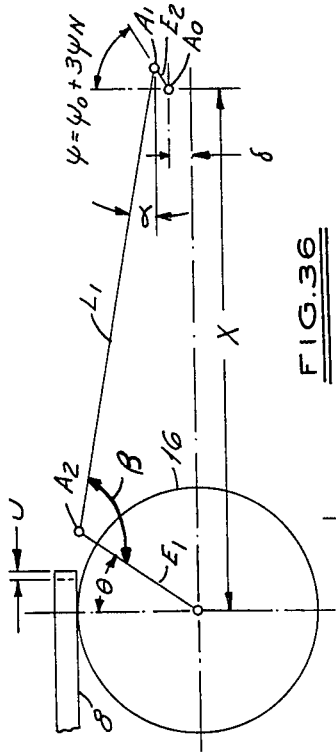

FIGS. 35 and 36, diagrammatic views of a mechanism relating to mathematical analysis of third harmonic systems.

Figure 37:
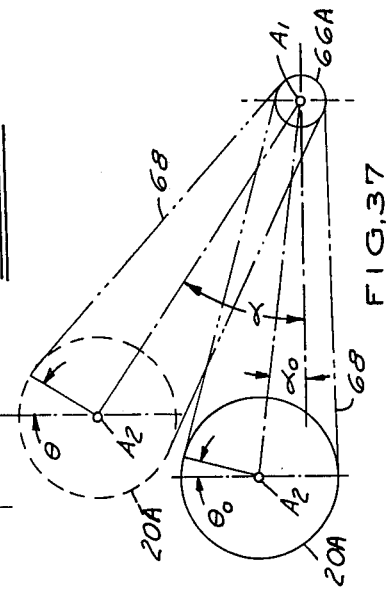

FIG. 37, a diagrammatic view illustrating the effect of a change in the angle $\alpha$.

Figure 38:
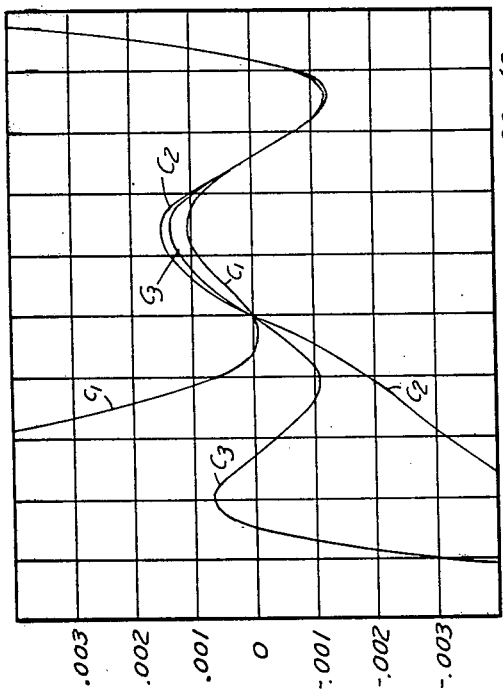
Figure 39:
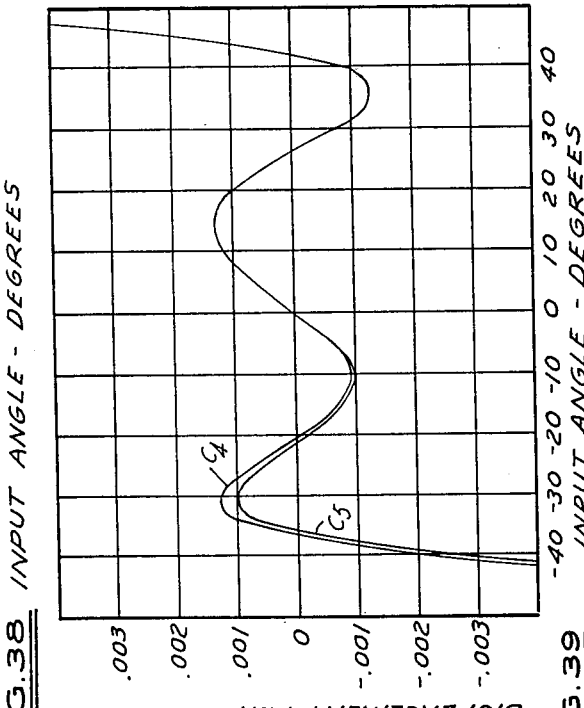

FIGS. 38 and 39, illustrations of the displacement curves for various variable combinations.

FIG. 40, a side view of a modified mechanism for a linear output drive.

FIG. 41, a sectional view on line 41—41 of FIG. 40.

FIG. 42, a third embodiment of a linear output system.

FIG. 43, a sectional view on line 43—43 of FIG. 42.

FIG. 44, a sectional view on line 44—44 of FIG. 42.

FIG. 45, a side view of a fourth embodiment for achieving linear output.

FIG. 46, a sectional view on line 46—46 of FIG. 45.

FIG. 47, a sectional view on line 47—47 of FIG. 45.

FIG. 48, a side view of a variation of the pivotal rack system of FIG. 45.

FIG. 49, a sectional view on line 49—49 of FIG. 48.

FIG. 50, a sectional view on line 50—50 of FIG. 48.

FIG. 51, a side view of a mechanism illustrating a rotary output utilizing an external gear.

FIG. 52, a sectional view of the mechanism of FIG. 51 taken on line 52—52 of FIG. 51.

FIG. 53, a sectional view of the mechanism of FIG. 51 taken on line 53—53 of FIG. 51.

FIG. 54, a side view of a mechanism illustrating a rotary output internal gear.

FIGS. 55 and 56, sectional views on lines 55—55 and 56—56 of FIG. 54, respectively.

FIG. 57, a side view of a kinematic equivalent of the internal gear mechanism of FIG. 54 using a chain and sprockets.

FIGS. 58 and 59, sectional views on lines 58—58 and 59—59, respectively, of FIG. 57.

FIG. 60, a side view of a kinematic equivalent of the external gear mechanism of FIG. 51 using a chain and sprockets.

FIGS. 61 and 62, sectional views on lines 61—61 and 62—62, respectively, of FIG. 60.

FIGS. 63, 64 and 65, a side view and sectional views on respective section lines 64—64 and 65—65 showing a modified structure wherein the higher harmonic is generated between the pair of moving axes.

Referring to the drawings: In FIGS. 1, 2, 3 and 4, a machine base 2 carries supporting brackets 4 and 6 mounted on both ends thereof. These brackets 4 and 6 in turn support a reciprocating or indexing member 8 through two sets of guide rollers 10 and 12 which support and guide the reciprocating member 8 along its path of travel.

A gear rack 14 is mounted to the reciprocating member 8 and is suitably formed to mesh with a drive gear 16 which is mounted by a spacer 18 (FIG. 2) from a sprocket 20 mounted on a shaft 22 which rotates on an axis $A_2$. The gear 16 is connected to a stub shaft 24 through bearings 26 and housing 28 permitting the shaft 24 to rotate with respect to gear 16 on an axis $A_3$ which is on the geometrical centerline of the gear 16. The shaft 24 is connected to a spacer 30 through a retainer 32; the other end of this spacer 30 carries two sets of guide rollers 34 and 36 which bear on a guide plate 38 mounted on the reciprocating member 8 parallel to the gear rack 14. It may be seen, therefore, that the spacer 30 with its associated members will maintain a constant distance from the pitch line of the rack 14 and the centerline $A_3$ of the gear 16.

The shaft 22 is mounted in bearings 40 and 42 in the outboard end of a pivoted bracket 44; the other end of the bracket 44 is pivoted through bearings 46 and 48 to the eccentric shaft sections 50 and 52 on moving axis $A_1$. These eccentric shaft sections 50 and 52 are rigidly attached to or made integral with a crankshaft 54 rotating on a fixed axis $A_0$ and mounted in bearings 56 and 58 which in turn are mounted in a bracket 60 attached to the frame 2.

The shaft 54 is caused to rotate about its axis $A_0$ by a gear reducer 62 mounted on the frame 2 such that its output shaft is also on axis $A_0$. An eccentric coupling 64 attaches the gear reducer 62 to the eccentric shaft section 52. A sprocket 66 is mounted on the eccentric shaft section 52 and rotates on the moving axis $A_1$. This sprocket 66 drives the sprocket 20 through a chain 68 through a two to one ratio; i.e., two revolutions of the sprocket 66 cause exactly one revolution of the sprocket 20. In some mechanical designs, the sprockets 66 and 20 may be replaced with suitably meshing gears, with or without intermediate idler gears, the sole criterion being that the shaft 22 on axis $A_2$ make one revolution for each two revolutions of the shaft 54 on axis $A_0$ or for each two revolutions of the shafts 50 and 52 on axis $A_1$.

The input shaft of the gear reducer 62 is driven by a pulley 70 through a belt 72 from pulley 74 which is mounted on the motor 76 in turn mounted on frame 2. This motor 76 is started and stopped by suitable limit switches, electrical circuits and integral or separate brakes.

For convenience in subsequent descriptions, the distance, or eccentricity from axis $A_1$ to $A_0$ is defined as $E_2$; the distance or eccentricity from axis $A_3$ to axis $A_2$ is defined as $E_1$; and the length of bracket 44 from axis $A_1$ to axis $A_2$ is defined as $L_1$ (See FIG. 14.).

It will be seen, therefore, that the movement of the output member 8 is created by the addition or superposition of four movement components; a unidirectional and substantially constant component caused by the rotation of the gear 16 about axis $A_3$; a fundamental (first harmonic) component which consists of one movement oscillation per output cycle and is caused by the rotation of the axis $A_3$ about the axis $A_2$; a second harmonic component which consists of two movement oscillations per output cycle and is caused by the rotation of the axis $A_1$ about the axis $A_0$; and a variable component containing many higher harmonics caused by the swinging of the axis $A_2$ about axis $A_1$.

The total combination of kinematics which can be achieved with knowledgeable design is, of course, enormous. A single but representative qualitative example is present in the kinematic line drawings, FIGS. 5, 6, 7, 8 and 9. The proportions shown are those required to achieve a very long dwell where dwell is defined as some very narrow range of output movement but not necessarily a complete standstill of the output member 8. It is assumed that the shaft 54 is rotating at some constant angular velocity about axis $A_0$ in the clockwise direction.

FIG. 5 illustrates the position of the components when the output member 8 is in the approximate center of dwell. The velocity of the output member 8 is at or near 0, and the acceleration of the output member 8 is also at or near 0. The displacement is defined as 0 at this position.

FIG. 6 illustrates the position of the components after the shaft 54 has rotated 180° clockwise from its position in FIG. 5. The velocity of the output member 8 has reached a moderate value (approximately ½ maximum) to the right while the acceleration has reached a maximum or near maximum to the right; the displacement is very small.

FIG. 7 illustrates the position of the components after the input shaft has rotated 360° clockwise from its position in FIG. 5. The velocity of the output member 8 has reached its approximate maximum value, and its acceleration has returned to near zero; the displacement is approximately one-half the stroke.

FIG. 8 illustrates the position of the components after the input shaft has rotated 540° clockwise from its position in FIG. 5. The velocity of the output member 8 has again reached a moderate value (approximately one-half maximum) and approximately one-half maximum) and approximately the same as that in FIG. 6, but the acceleration has now reached a maximum or near maximum to the left or in the opposite direction as that of FIG. 6; the displacement has reached nearly full stroke.

In FIG. 9, the output member 8 is again in dwell, but it has now moved through a distance or stroke equal to the pitch circumference of the gear 16. Its velocity and acceleration are again at or near zero.

In essence, the output is a superposition of a substantially constant velocity component created by the angular movement of the gear 16, plus a fundamental or once per cycle oscillation of the axis $A_3$, as axis $A_2$ and $A_3$ rotate about each other, plus a second harmonic or two per cycle oscillation created by the rotation of axis $A_1$ about axis $A_0$, plus the effect created by the oscillation of axis $A_2$ about axis $A_1$.

It is also clear from the mechanism drawings of FIGS. 1-4 and from the kinematic line drawings of FIGS. 5-9 that the mechanism is inherently reversible; if in FIG. 9 the input shaft 54 is rotated in the counterclockwise direction through a total angle of 720°, the mechanism will return to the position shown in FIG. 5, sequentially progressing through the stages shown by FIGS. 8, 7 and 6. On the "return" stroke with the shaft 54 rotating counterclockwise, what has been decelerations now become accelerations and vice versa. Velocity characteristics remain the same but in the opposite direction.

Pure Functions Dwell Techniques

The mathematical or quantitative behavior of the system using second harmonic addition may most easily be illustrated by temporarily ignoring the effect created by the oscillation of axis $A_2$ about axis $A_1$, or by assuming that the distance $L_1$ is very long in comparison to the eccentricities $E_1$ and $E_2$. For convenience, the radius of the gear 16 is defined as 1 unit and the values of $E_1$ and $E_2$ are proportionate factors of that unit.

FIG. 10 is an "exploded" diagram of the various components which are superimposed to create the total output movement. If U is defined as the output movement (positive to the right) and $2\theta$ is defined as the rotation of the shaft 54 from its initial position, then $$U = \theta - E_1 \sin \theta + E_2 \sin 2\theta \quad (1)$$

By differentiation, the relative velocity becomes:

$$dU/d\theta = 1 - E_1 \cos \theta + 2E_2 \cos 2\theta \text{ (velocity)} \quad (2)$$

The acceleration therefore becomes:

$$d^2U/d\theta^2 = E_1 \sin \theta - 4E_2 \sin 2\theta \text{ (acceleration)} \quad (3)$$

The slope of the acceleration becomes:

$$d^3U/d\theta^3 = E_1 \cos \theta - 8E_2 \cos 2\theta \quad (4)$$

At $\theta = 0$, the acceleration equals 0 for all values of $E_1$ and $E_2$; therefore, to achieve a long dwell, it is hypothesized that $E_1$ and $E_2$ be evaluated by establishing that the velocity, $dU/d\theta$, and the slope of the acceleration, $d^3U/d\theta^3$, be 0 at $\theta = 0$. Therefore, $$1 - E_1 + 2E_2 = 0 \text{ (From } dU/d\theta = 0; \theta = 0)$$

and $$E_1 - 8E_2 = 0 \text{ (From } d^3U/d\theta = 0; \theta = 0)$$

Then
$$E_1 = 1.33$$
$$E_2 = .167$$

This then establishes the magnitudes of the two eccentricities $E_1$ and $E_2$ in relationship to the radius of the drive gear 16. When these values of $E_1$ and $E_2$ are substituted back into equation (1) and the values of displacement U calculated over a range of values of $\theta$, the curve $A_0$ of FIG. 11 results. For comparative purposes, a curve marked "Ref." is also shown; this represents the characteristics of the dwell if $E_2 = 0$ and $E_1 = 1$, i.e., the magnitude of the second harmonic is 0. The values of the displacement in FIG. 11 are on a scale in which the full stroke from dwell to dwell is $2\pi$ units.

A second and improved method to achieve the maximum practical dwell will now be described. In terms of pure mathematics, a dwell occurs only when $dU/d\theta = 0$. However, in a practical sense, a dwell occurs when the output oscillates within a very narrow range over a considerable range of input angle, $\theta$. The width of the oscillation range of the displacement allowable is dependent on the practical application, and must take into consideration such factors as gear backlash, bearing clearances, and output accuracy required.

Since the equation (1) is an "odd" function, i.e., $f(\theta) = -f(-\theta)$, it may be seen that if the displacement reaches 0 at some value of $\theta = \theta_{N_1}$, then the displacement reaches 0 at $\theta = -\theta_{N_1}$. Since $U = 0$ at $\theta = 0$ for all values of $E_1$ and $E_2$, it becomes possible to "force" the displacement to pass through 0 at five points if the proper values of $E_1$ and $E_2$ may be found, these five points being at $\theta = -\theta_{N_2}, -\theta_{N_1}, 0, \theta_{N_1}$ and $\theta_{N_2}$, where $\theta_{N_1}$ and $\theta_{N_2}$ are two arbitrarily but knowledgeably assigned values of $\theta$ where the displacement must be 0. By applying the condition that $U = 0$ for $\theta = \theta_{N_1}$ into equation (1), a first relationship is established between $E_1$ and $E_2$ as follows:

$$\theta_{N_1} - E_1 \sin \theta_{N_1} + E_2 \sin 2\theta_{N_1} = 0 \quad (5)$$

Similarly:

$$\theta_{N_2} - E_1 \sin \theta_{N_2} + E_2 \sin 2\theta_{N_2} = 0 \quad (6)$$

Therefore, equations (5) and (6) may be solved to find the values of $E_1$ and $E_2$ which satisfy both equations. Several illustrative representative solutions to equations (5) and (6) are presented in the table shown below.

| Assigned Values | | Coefficients | | Curve |
|---|---|---|---|---|
| $\theta_{N_1}$ | $\theta_{N_2}$ | $E_1$ | $E_2$ | |
| 30° | 50° | 1.4040 | .20603 | FIG. 11 |
| 30° | 45° | 1.3934 | .19986 | $A_1$ |
| 30° | 40° | 1.3842 | .19455 | |
| 25° | 45° | 1.3886 | .196461 | |
| 25° | 40° | 1.3791 | .19125 | $A_2$ |
| 25° | 35° | 1.3710 | .18680 | |
| 20° | 40° | 1.3751 | .18860 | |
| 20° | 35° | 1.3668 | .18421 | $A_3$ |
| 20° | 30° | 1.3599 | .18052 | |

If any pair of these coefficients is substituted back into equation (1) and the values of U calculated for various values of $\theta$, a displacement graph may be made. Three exemplary pairs of coefficients have been used and the results plotted in FIG. 11 as curves $A_1$, $A_2$, and $A_3$ as noted in the table above. As expected, the curves cross the axis at the values of $\theta_N$ which were used to calculate the associated coefficients $E_1$ and $E_2$. Bearing in mind that all three curves have point symmetry about the origin, it can be seen that the displacement passes through 0 five times. By a judicious choice of $\theta_{N_1}$ and $\theta_{N_2}$ a dwell band suited to the application may be found.

Using curve $A_2$ as an example, it will be noted that the total displacement oscillation lies within ± 0.0005 for an input angle range of ± 44°. Since this movement is relative to $2\pi$ units of stroke, a dwell of 88° is achieved if dwell is defined as 1/6280th of the stroke, which is representative of many practical applications, e.g., in a 20 inch stroke, the dwell "oscillation" is only 0.003 inch which is comparable to gear backlashes and bearing clearances.

The dynamic characteristics of this maximum dwell configuration are presented in FIGS. 12 and 13, Curve A, which fairly approximates the results with any pair of coefficients in the table. FIG. 12 is a plot of the relative velocity over the entire index cycle where relative velocity is the ratio of the actual velocity to the average velocity over the cycle. The curve marked "Ref." in FIG. 12 is the graph for a simple cycloid, i.e. $E_1 = 1$ and $E_2 = 0$.

FIG. 13 is a plot of the relative acceleration over the entire index cycle, where relative acceleration is the ratio of the actual acceleration to the peak acceleration of the equivalent cycloidal acceleration. The curve marked "Ref." in FIG. 13 is again the graph for a simple cycloid.

Pure Functions Reduction of Max Velocity

As shown above, the introduction of the second harmonic may be utilized to create a significant increase of the practical dwell. Alternately, the second harmonic may be utilized to minimize the peak velocity reached at or near midstroke. In most practical applications, a dwell as large as possible is still desired. Only two independent relationships may be imposed on $E_1$ and $E_2$. The first will be chosen to make the velocity as flat as possible at $\theta = 180°$. This is achieved when the slope of the acceleration, $d^3U/d\theta^3$, is 0, since the acceleration, $d^2U/d\theta^2 = 0$ at $\theta = 180°$ for all values of $E_1$ and $E_2$. Therefore, from equation (4):

$$-E_1 - 8E_2 = 0 \qquad (7)$$

The second relationship may be generated by again "forcing" the displacement to pass through 0 at an angle $\theta = \theta_{N_3}$ whereupon the displacement has a triple 0; i.e., $U = 0$ at $\theta = -\theta_{N_3}$, 0, and $\theta_{N_3}$. This second relationship then becomes:

$$\theta_{N_3} - E_1 \sin \theta_{N_3} + E_2 \sin 2\theta_{N_3} = 0 \qquad (8)$$

When equations (7) and (8) are solved for various values of $\theta_{N_3}$, specific values of $E_1$ and $E_2$ are found to satisfy both equations. Several illustrative solutions to equations (7) and (8) are presented in the table below:

| Assigned Value | Coefficients | | Curve |
|---|---|---|---|
| $\theta_{N_3}$ | $E_1$ | $E_2$ | |
| 4 | .801040 | −.100130 | FIG. 11 |
| 6 | .802343 | −.100293 | |
| 8 | .804171 | −.100521 | $B_1$ |
| 10 | .806527 | −.100816 | |
| 12 | .809416 | −.101177 | $B_2$ |
| 14 | .812845 | −.101606 | |
| 16 | .816821 | −.102103 | $B_3$ |
| 18 | .821353 | −.102669 | |
| 20 | .826448 | −.103306 | |

As noted in the table above, three sets of these coefficients were utilized in equation (1) to calculate the curves $B_1$, $B_2$, and $B_3$ in FIG. 11. It will be noted that the dwell characteristics are markedly inferior to those attainable in the maximum dwell configuration, but still usable in many practical applications.

The relative velocity characteristics of this configuration are presented by curve B in FIG. 12. Only one curve is presented since the difference in the velocity characteristics when using any pair of coefficients from the table above is very small. It will be noted that the relative velocity is both lower and flatter than either the "Ref." curve or curve A representing the maximum dwell configuration.

The relative acceleration characteristics of this configuration are presented as curve B in FIG. 13.

The change in sign of the eccentricity $E_2$ indicates that the movement component created by the eccentricity, $E_2$ is in the opposite direction from that shown in FIG. 10. One way this may be accomplished is by changing the initial position of $E_2$ to be diametrically opposite that shown in FIGS. 5 and 10. Therefore, the initial starting position of the system when operating under these conditions is shown in FIG. 14.

In both of the applications described above, the kinematic diagrams were predicated on the condition that the eccentricities $E_1$ and $E_2$ were rotating in the same direction. This is the case if sprocket 66 and 20 are chain connected as shown in FIGS. 1 and 4, or if they are replaced by gears having one intermediate idler gear interposed (or an odd number of interposed intermediate idlers). If, however, the interconnecting drive between shafts 54 and 22 is such that shafts 54 and 22 rotate in opposite directions, the kinematic diagrams will change, but the results will be the same; but this is only true as long as the effect of the oscillation of axis $A_2$ about $A_1$ is ignored. The initial starting condition for the maximum dwell mode and opposite rotation of shafts 54 and 22 is shown in FIG. 15; the initial starting conditions for the minimum peak velocity mode and opposite rotation of shafts 54 and 22 is shown in FIG. 16.

While the creation of an improved dwell or reduced peak velocity are practically of the greatest significance relative to this system, other variations and combinations are possible. In essence, it is possible to achieve or approximate any movement profile which may be mathematically constructed using harmonic synthesis based on the first and second harmonics. This specifically includes non-symmetrical conditions created by a phase shift between the first and second harmonics as represented by the equation:

$$U = \theta - E_1 \sin \theta + E_2 \sin(2\theta + \phi)$$

where $\phi$ is the phase shift angle.

In the foregoing analyses, the oscillation of axis $A_2$ about axis $A_1$ was omitted to simplify the conceptual presentation. However, the values of $E_1$ and $E_2$ obtained in these simplified analyses are fair approximations to those found for the complete system. Furthermore, the basic "framework" of the analysis may be carried forward to the completely rigorous analyses in which the oscillation of axis $A_2$ about axis $A_1$ is included. For example, to find those conditions where a maximum dwell is attained, the concept of "forcing" the displacement to go through 0 five times is still valid. Techniques dependent on differentiation are of little value because, as will be seen, many of the relationships are of such complexity as to make differentiation impractical.

FIG. 17 is a kinematic line drawing of the mechanism at a position representing the center of the dwell for the maximum dwell mode in which the eccentricities $E_1$ and $E_2$ rotate in the same direction. The variables are defined as follows:

For convenience of analysis, the radius of the drive gear 16 is taken as 1; therefore, all other lengths are related to this unit which in effect establishes the scale.

Design assumptions:
$L_1 =$ Distance between axes $A_1$ and $A_2$ on bracket 44
$\delta =$ Distance of axis $A_0$ along a line perpendicular to rack pitch line from a line through the center of gear 16 parallel to rack pitch line Unknowns to which values are temporarily assigned:
$E_1 =$ Distance from axis $A_2$ to $A_3$
$E_2 =$ Distance from axis $A_0$ to $A_1$
$\theta_o =$ Angle between $E_1$ and line perpendicular to pitch line of rack
$\psi_o =$ Angle between $E_2$ and line perpendicular to pitch line of rack Dependent variables:
$\alpha_o =$ Angle between $L_1$ and a line parallel to rack pitch line
$\beta_o =$ Angle between $L_1$ and $E_1$
$X_o =$ Distance from axis $A_0$ to axis $A_3$ along a line parallel to rack pitch line It may be seen that the values of the dependent variables may be calculated from the assigned variables according to the following formulas:

$$\alpha_o = \sin^{-1}\left(\frac{E_1 \cos \theta_o - \delta - E_2 \cos \psi_0}{L_1}\right) \quad (9)$$

$$\beta_o = \theta_o - \alpha_o + 90° \quad (10)$$

$$X_o = E_1 \sin \theta_o + L_1 \cos \alpha_o - E_2 \sin \psi_o \quad (11)$$

FIG. 18 is a kinematic line drawing of the mechanism after the eccentricity $E_2$ has rotated through an angle $2\psi_N$ from its initial position to reach a new position at which the new angles and distances reached are as follows:

$\psi = \psi_o + 2\psi_N =$ angle between $E_2$ and a line perpendicular to pitch line of rack $\theta =$ Angle between $E_1$ and a line perpendicular to pitch line of rack $\alpha =$ Angle between $L_1$ and a line parallel to pitch line of rack $\beta =$ Angle between $L_1$ and $E_1$ $X =$ Distance from axis $A_0$ to axis $A_3$ along a line parallel to rack pitch line $U =$ Movement of rack from its initial position in FIG. 17

It must be noted that the rotation of $E_2$ relative to $L_1$ about $A_1$ causes a rotation of $E_1$ relative to $L_1$ about $A_2$ due to the 2:1 drive ratio between them because of sprockets 66 and 20 and interconnection chain 68 or equivalent. Now, if $\alpha = \alpha_o$, then $\theta - \theta_o = \psi N$; however ordinarily $\alpha \neq \alpha_o$ and an iterative technique must be used to evaluate $\theta$ for a given $\psi N$.

FIG. 19 is a kinematic drawing showing the effect of a change in the angle $\alpha$ on the angle $\theta$. This must be superimposed on the relationship $\theta - \theta_N = \psi N$.

From FIG. 19, $$\theta - 0_o = \frac{\alpha - \alpha_o}{2}$$

Therefore:

$$\theta - \theta_o = \psi_N + \frac{\alpha - \alpha_o}{2} \quad (12)$$

or $$\theta = \theta_o + \psi_N + \frac{\alpha - \alpha_o}{2}$$

From FIG. 18, it may be seen that:

$$\alpha = \sin^{-1}\left(\frac{E_1 \cos \theta - \delta - E_2 \cos(\psi_o + 2\psi_N)}{L_1}\right) \quad (13)$$

Equations (12) and (13) must be iterated to find a unique value of $\theta$ for each specified value of $\psi_N$. This is most easily done by assuming $\alpha = \alpha_o$ in equation (12) calculating $\theta$, substituting in (13), and calculating a new $\alpha$; this is then used in (12) and the entire process repeated until the values of $\alpha$ and $\theta$ satisfy both equations.

With $\theta$ so established, the value X may be calculated from FIG. 18.

$$X = E_1 \sin \theta + L_1 \cos \alpha - E_2 \sin \psi \quad (14)$$

The output movement U, due to a rotation of $E_2$ through an angle $2\psi_n$ is seen to be:

$$U = \theta - \theta_o - (X - X_o) \quad (15)$$

If the two angles at which the mechanism is to have zero output movement are defined as $\psi_{N_1}$ and $\psi_{N_2}$, the foregoing technique permits the calculation of the actual output movements at those angles which are defined as $U_{N_1}$ and $U_{N_2}$, respectively, and it is the object of this analysis to find those conditions which result in $U_{N_1} = 0$ and $U_{N_2} = 0$. There are, however, four conditions or input variables which may be varied to achieve $U_{N_1} = U_{N_2} = 0$ and a multiplicity of solutions must exist.

Accordingly, using the simplified analysis as a guide, an additional restraint is placed on the system, which is that at the initial point, the output acceleration being 0. This is very closely approximated by imposing the following relationships:

$$\theta_o = \psi_o$$

$$\beta_o = 90°$$

from which $\beta_o = \theta_o$. (from equation 10)
Substituting into equation (9) and simplifying $$(E_1 - E_2) \cos \theta_o - L_1 \sin \theta_o = \delta \quad (16)$$

$\theta_o$ may be determined from equation (16) and this same value assigned to $\alpha_o$ and $\psi_o$. Now only two unknowns remain: $E_1$ and $E_2$. For a first analysis $E_1$ and $E_2$ are assigned the values found from the simplified analysis which were 1.33 and 0.167 respectively. $\theta_o$, $\alpha_o$ and $\psi_o$ are found from equation (16).

For the first angle $\psi_{N_1}$, the corresponding $U_{N_1}$ is calculated as described above; similarly, for the second angle $\psi_{N_2}$, the corresponding $U_{N_2}$ is calculated.

These values of $U_{N_1}$ and $U_{N_2}$ are in effect errors which it is intended to eliminate. Therefore, it is hypothesized that these errors are created by an error function of the form:

$$U_E = G_1 \sin Q + G_2 \sin 2Q$$

Since at $Q = \psi_{N_1}$, $U_E = U_{N_1}$ $$U_{N_1} = G_1 \sin \psi_{N_1} + G_2 \sin 2\psi_{N_1} \quad (17)$$

And since at $Q = \psi_{N_2}$, $U_E = U_{N_2}$ $$U_{N_2} = G_1 \sin \psi_{N_2} + G_2 \sin 2\psi_{N_2} \quad (18)$$

Equations (17) and (18) may be solved to find distinct values of $G_1$ and $G_2$ which are the coefficients of a hypothetical function which generates the same errors as those found in the actual mechanism. Since the magnitude of the fundamental component in the actual mechanism is related to the magnitude of $E_1$ a corrected value of $E_1$ is found by subtracting $G_1$ from the originally assumed value of $E_1$, i.e., $$E_1 \text{(corrected)} = E_1 \text{(original)} + G_1$$

Similarly, $$E_2 \text{(corrected)} + E_2 \text{(original)} - G_2$$

The corrected values of $E_1$ and $E_2$ are now used to calculate new values of $\theta_o$, $\alpha_o$ and $\psi_o$ and the entire calculation procedure repeated to find new values of $U_{N_1}$ and $U_{N_2}$ which are found to be significantly smaller than those based on the original values of $E_1$ and $E_2$; $G_1$ and $G_2$ are also recalculated and $E_1$ and $E_2$ recorrected. This procedure may be repeated until the values of $U_{N_1}$ and $U_{N_2}$ become arbitrarily small. It is found that the solution converges quite rapidly. A programmable calculator or computer is a great convenience, but not an absolute necessity in these calculations.

Using the technique described above and assuming the following input parameters:
$L_1 = 3$
$\delta = 0$
$\psi_{N_1} = 30°$
$\psi_{N_2} = 50°$
the following results were obtained:
$E_1 = 1.372$
$E_2 = 0.206343$
$\theta_o = \psi_o = 21.2337°$ When these values were utilized to calculate the displacement over a range of values of the input angle $\psi$, curve $C_1$ in FIG. 20, was obtained. It will be understood that in this case, the term "primary rotation" means the rotation of the input eccentricity away from its null position (as defined by $\psi_o$), divided by two. It will be noted that curve $C_1$ leaves the graph in the internal from $-72°$ to $-15°$ forming a peak (not shown) of 0.040 at $-50°$. It may be seen, therefore, that while the curve $C_1$ crosses the axis at $\psi = 0°$, 30° and 50° as intended, the displacement in the range of negative values of $\psi$ is not attractive.

To correct this deficiency, it becomes necessary to modify one of the original parameter assumptions from $\psi_o = \theta_o$ to $\psi_o = \theta_o + \epsilon$, where $\epsilon$ is some small angle which is in effect a phase shift between the eccentricities $E_1$ and $E_2$. The null diagram shown in FIG. 17 is still valid but it will be understood that now $\psi_o = \theta_o + \epsilon$.

Equation (16) now becomes:

$$E_1 \cos \theta_o - E_2 \cos (\theta_o + \epsilon) - L_1 \sin \theta_o - \delta \quad (16a)$$

from which $\theta_o$ may be determined.

The remainder of the technique remains unaltered and when an $\epsilon$ of 5° is assumed with the other input parameters unaltered ($L_1 - 3$, $\delta - 0$, $\psi_{N_1} = 30$, $\psi_{N_2} = 50$), the following results were obtained:
$E_1 = 1.31992$
$E_2 = 0.188564$
$\theta_o = 20.7786°$
$\psi_o = 25.7786°$ When these values were utilized to calculate the displacement over a range of values of the input angle $\psi$, the curve $C_2$ in FIG. 20 was obtained. It will be noted that while this curve also passes through 0 at 0, 30° and 50°, its behavior at negative values of $\psi$ is just the opposite of that found for $C_1$ ($\epsilon = 0$).

A new phase shift angle is now assumed: $\epsilon = 2.5°$. This gives rise to the curve $C_3$ in FIG. 20. A still newer phase shift angle of $\epsilon = 4°$ is now assumed which is the basis of curve $C_4$ in FIG. 21. (FIG. 21 is presented to avoid congestion in FIG. 20). A marked improvement in the displacement characteristics for negative values of $\psi$ is to be noted.

By visual interpolation between curves $C_2$ ($\epsilon = 5°$) and $C_4$ ($\epsilon = 4°$), a value of 4.2° was assigned to $\epsilon$; this yields the final results:
$E_1 = 1.32766$
$E_2 = 0.191129$
$\theta_o = 20.8464°$
$\psi_o = 25.0464°$ When these values were used to calculate the displacement over a range of $\psi$, the curve $C_5$ in FIG. 21 was obtained. It will be noted that the characteristics in the negative region are substantially similar to those in the positive region and that it is indeed possible to find a practical solution to the system which causes the displacement to cross "0" five times, thereby creating a practical dwell of considerable proportions. In this case, the mechanism displacement output lies within a band of $\pm 0.0018$ (relative to 6.28 total stroke) for 100° or more than one-fourth of the input cycle which is excellent for many practical applications.

The calculating technique outlined above is obviously involved and laborious. However, after a family of related solutions is found, it is possible to relate new assumptions to existing solutions to make convergence quite rapid. This technique is presented as an example that works to achieve the desired characteristics. Other systems of curve fitting may be utilized with equal validity.

Comparable techniques are available to find combinations of $E_1$, $E_2$, $\theta_o$ and $\psi_o$ which result in low peak velocities during the center portion of the stroke. Under these conditions, the dwell characteristics are compromised within the framework established by the simplified solutions, in which the effect of the movement of axis $A_2$ about axis $A_1$ was temporarily ignored.

The mechanism shown in FIGS. 1, 2, 3 and 4 is illustrative of a system in which the higher harmonic that is mechanically superimposed is at twice the frequency of the fundamental or first harmonic component and the subsequent mathematical analyses are based on this second harmonic addition.

Essentially, the same mechanism may also be employed to introduce a third harmonic component (or indeed any other higher harmonic component may be so introduced). The mechanism shown in FIG. 22 is modified for the introduction of a third harmonic in lieu of a second harmonic, i.e., the mechanical superposition of a cyclically varying motion at a frequency three times greater than the oscillatory frequency of the fundamental or first harmonic.

Referring to FIG. 22, it will be seen that the structure and function of the mechanism is substantially identical with the structure and function of the mechanism of FIG. 1 with the following exception. Whereas in FIG. 1, the ratio between the sprocket 66 and the sprocket 20 was 2:1, in FIG. 22, the ratio between the sprocket 66A and sprocket 20A is 3 to 1, i.e., three revolutions of the sprocket 66A cause one revolution of the sprocket 20A. Accordingly, the axis $A_1$ rotates three times around the axis $A_0$ while the axis $A_2$ and $A_3$ make only one revolution about each other.

While this change of ratio is a relatively simple mechanical difference, it creates significant changes in the kinematic characteristics of the mechanism as is explained below.

It will be seen, therefore, that the movement of the output member 8 in FIG. 22 is created by the addition or superposition of four movement components; a unidirectional and substantially constant component caused by the rotation of the gear 16 about axis $A_3$; a fundamental (first harmonic) component which consists of one movement oscillation per output cycle and is caused by the rotation of the axis $A_3$ about the axis $A_2$; a third harmonic component which consists of three oscillations per output cycle and is caused by the rotation of the axis $A_1$ about the axis $A_0$; and a variable component containing many higher harmonics caused by the swinging of the axis $A_2$ about axis $A_1$.

The total combination of kinematics which can be achieved with third harmonic addition is as great as with second harmonic addition. A single but representative qualitative example is present in the kinematic line drawings, FIGS. 23, 24, 25, 26 and 27. The proportions shown are those required to achieve a very long dwell where dwell is again defined as some very narrow range of output movement but not necessarily a complete standstill of the output member 8. It is assumed that the shaft 54 is rotating at some constant angular velocity about axis $A_0$ in the clockwise direction.

FIG. 23 illustrates the position of the components when the output member 8 is in the approximate center of dwell. The velocity of the output member 8 is at or near 0, and the acceleration of the output member 8 is also at or near 0. The displacement is defined as 0 at this position.

FIG. 24 illustrates the position of the components after the shaft 54 has rotated 270° clockwise from its position in FIG. 23. The velocity of the output member 8 has reached a moderate value (approximately ½ maximum) to the right while the acceleration has reached a maximum or near maximum to the right; the displacement is very small.

FIG. 25 illustrates the position of the components after the input shaft has rotated 540° clockwise from its position in FIG. 23. The velocity of the output member 8 has reached its approximate maximum value, and its acceleration has returned to near zero; the displacement is approximately one-half the stroke.

FIG. 26 illustrates the position of the components after the input shaft has rotated 810° clockwise from its position in FIG. 23. The velocity of the output member 8 has again reached a moderate value (approximately ½ maximum) and approximately the same as that in FIG. 24), but the acceleration has now reached a maximum or near maximum to the left or in the opposite direction as that of FIG. 24; the displacement has reached nearly full stroke.

In FIG. 27, the output member 8 is again in dwell but it has now moved through a distance or stroke equal to the pitch circumference of the gear 16. Its velocity and acceleration are again at or near zero.

In essence, the output motion is a superposition of a substantially constant velocity component created by the angular movement of the gear 16, plus a fundamental or once per cycle oscillation of the axis $A_3$, as axis $A_2$ and $A_3$ rotate about each other, plus a third harmonic or three per cycle oscillation created by the rotation of axis $A_1$ about axis $A_0$, plus the effect created by the oscillation of axis $A_2$ about axis $A_1$.

As was the case with the second harmonic embodiment of FIGS. 1-4, the third harmonic embodiment of FIG. 22 is also inherently reversible. This is further clarified by reference to FIGS. 23-27; if in FIG. 27 the input shaft 54 is rotated in a counterclockwise direction through a total angle of 1080°, the mechanism will return to the position shown in FIG. 23, sequentially progressing through the stages shown by FIGS. 26, 25 and 24. On the "return" stroke with the shaft 54 rotating counterclockwise, what had been decelerations now become accelerations and vice versa. Velocity characteristics remain the same but in the opposite direction.

Pure Functions Dwell Techniques

The mathematical or quantitative behavior of the system using third harmonic addition may most easily be illustrated by temporarily ignoring the effect created by the oscillation of axis $A_2$ about axis $A_1$, or by assuming that the distance $L_1$ is very long in comparison to the eccentricities $E_1$ and $E_2$. For convenience, the radius of the gear 16 is again defined as 1 unit and the values of $E_1$ and $E_2$ are proportionate factors of that unit.

FIG. 28 is an "exploded" diagram of the various components which are superimposed to create the total output movement. If U is defined as the output movement (positive to the right) and $3\theta$ is defined as the rotation of the shaft 54 from its initial position, then $$U = \theta - E_1 \sin \theta + E_2 \sin 3\theta \quad (19)$$

By differentiation, the relative velocity becomes:

$$dU/d\theta = 1 - E_1 \cos \theta + 3E_2 \cos 3\theta \text{ (velocity)} \quad (20)$$

The acceleration therefore becomes:

$$d^2U/d\theta^2 \; 32 \; E_1 \sin \theta - 9E_2 \sin 3\theta \text{ (acceleration)} \quad (21)$$

The slope of the acceleration becomes:

$$d^3U/d\theta^3 = E_1 \cos \theta - 27E_2 \cos 3\theta \quad (22)$$

The curvature of the acceleration is related to $$d^4U/d\theta^4 = -E_1 \sin \theta + 81 E_2 \sin 3\theta \quad (23)$$

At $\theta = 0$, the acceleration equals 0 for all values of $E_1$ and $E_2$; therefore, to achieve a long dwell, it is hypothesized that $E_1$ and $E_2$ be evaluated by establishing that the velocity, $dU/d\theta$ and the slope of the acceleration, $d^3U/d\theta 3$, be 0 at $\theta = 0$. Therefore, $$1 - E_1 + 3E_2 = 0 \text{ (From } dU/d\theta = 0; \theta = 0\text{)}$$

and $$E_1 - 27E_2 = 0 \text{ (From } d^3U/d\theta^3 = 0; \theta = 0\text{)}$$

Then
$E_1 = 1.1250$
$E_2 = 0.04167$

This then establishes the magnitudes of the two eccentricities $E_1$ and $E_2$ in relationship to the radius of the drive gear 16. When these values of $E_1$ and $E_2$ are substituted back into equation (19) and the values of displacement U calculated over a range of values of $\theta$, the curve $A_0$ of FIG. 29 results. For comparative purposes, a curve marked "Ref." is also shown; this represents the characteristics of the dwell if $E_2 = 0$ and $E_1 = 1$, i.e., the magnitude of the third harmonic is 0. The values of the displacement in FIG. 29 are on a scale in which the full stroke from dwell is $2\pi$ units.

A second and improved method to achieve the maximum practical dwell will now be described. This method is the same as regards technique as that utilized to improve the dwell for the second harmonic embodiment. It is now illustrated relative to the third harmonic embodiment. In terms of pure mathematics, a dwell occurs only when $dU/d\theta = 0$. However, in a practical sense, a dwell occurs when the output oscillates within a very narrow range over a considerable range of input angle, $\theta$. The width of the oscillation range of the displacement allowable is dependent on the practical application, and must take into consideration such factors as gear backlash, bearing clearances, and output accuracy required.

Since the equation (19) is an "odd" function, i.e., $f(\theta) = -f(-\theta)$, it may be seen that if the displacement reaches 0 at some value of $\theta = \theta_{N_1}$, then the displacement reaches 0 at $\theta = -\theta_{N_1}$. Since $U = 0$ at $\theta = 0$ for all values of $E_1$ and $E_2$, it becomes possible to "force" the displacement to pass through 0 at five points if the proper values of $E_1$ and $E_2$ may be found, these five points being at $\theta = -\theta_{N_2}, -\theta_{N_1}, 0, \theta_{N_1}$ and $\theta_{N_2}$, where $\theta_{N_1}$ and $\theta_{N_2}$ are two arbitrarily but knowledgeably assigned values of $\theta$ where the displacement must be 0. By applying the condition that $U = 0$ for $\theta = \theta_{N_1}$ into equation (19), a first relationship is established between $E_1$ and $E_2$ as follows:

$$\theta_{N_1} - E_1 \sin \theta_{N_1} + E_2 \sin 3\theta_{N_1} = 0 \qquad (24)$$

Similarly $$\theta_{N_2} - E_1 \sin \theta_{N_2} + E_2 \sin 3\theta_{N_2} = 0 \qquad (25)$$

Therefore, equations (24) and (25) may be solved to find the values of $E_1$ and $E_2$ which satisfy both equations. Several illustrative representative solutions to equations (24) and (25) are presented in the table shown below.

| Assigned Values | | Coefficients | | Curve |
|---|---|---|---|---|
| $\theta_{N_1}$ | $\theta_{N_2}$ | $E_1$ | $E_2$ | |
| 30° | 50° | 1.18375 | .06827 | FIG. 29 |
| 30° | 45° | 1.17424 | .06352 | |
| 30° | 40° | 1.16640 | .05960 | |
| 25° | 45° | 1.17160 | .06088 | |
| 25° | 40° | 1.16314 | .05718 | $A_2$ |
| 25° | 35° | 1.15617 | .05413 | |
| 20° | 40° | 1.16058 | .05528 | |
| 20° | 35° | 1.15320 | .05237 | |
| 20° | 30° | 1.14717 | .04999 | $A_1$ |

If any pair of these coefficients is substituted back into equation (19) and the values of U calculated for various values of $\theta$, a displacement graph may be made. Two exemplary pairs of coefficients have been used and the results plotted in FIG. 29 as curves $A_1$ and $A_2$ as noted in the table above. As expected, the curves cross the axis at the values of $\theta_N$ which were used to calculate the associated coefficients $E_1$ and $E_2$. Bearing in mind that both curves have point symmetry about the origin, it can be seen that the displacement passes through 0 five times. By a judicious choice of $\theta_{N_1}$ and $\theta_{N_2}$ a dwell band suited to the application may be found.

Using curve $A_2$ as an example, it will be noted that the total displacement oscillation lies within ± 0.0012 for an input angle range of ± 42°. Since this movement is relative to $2\pi$ units of stroke, a dwell of 84° is achieved if dwell is defined as 1/2600th of the stroke, which is representative of many practical applications, e.g., in a 10 inch stroke, the dwell "oscillation" is only 0.004 inch which is comparable to gear backlashes and bearing clearances.

The dynamic characteristics of this maximum dwell configuration are presented in FIGS. 30 and 31, Curve A, which fairly approximates the results with any pair of coefficients in the table. FIG. 30 is a plot of the relative velocity over the entire index cycle where relative velocity is the ratio of the actual velocity to the average velocity over the cycle. The curve marked "Ref." in FIG. 30 is the graph for a simple cycloid, i.e., $E_1 = 1$ and $E_2 = 0$.

FIG. 31 is a plot of the relative acceleration over the entire index cycle, where relative acceleration is the ratio of the actual acceleration to the peak acceleration of the equivalent cycloidal acceleration. The curve marked "Ref." in FIG. 31 is again the graph for a simple cycloid.

By comparing the attainable dwell characteristics of a second harmonic addition system as illustrated by FIG. 11, with the attainable dwell characteristics of a third harmonic addition system as illustrated by FIG. 29, it is evident that the second harmonic addition system is superior. By extrapolation and by a knowledge of harmonic synthesis, it is evident that as the harmonic to be added is increased the dwell characteristics become less wide, though still better than without the addition of any higher harmonic.

Pure Functions Reduction of Max Acceleration

As shown above, the introduction of the third harmonic may be utilized to create a significant increase of the practical dwell. Alternatively, the third harmonic may be utilized to minimize the peak acceleration reached at or near the input quarter points, 90° and 270°. In most practical applications, a dwell as large as possible is still desired. Only two independent relationships may be imposed on $E_1$ and $E_2$. The first will be chosen to make the acceleration as flat as possible at $\theta = 90°$ and $\theta = 270°$. This is achieved when the curvature of the acceleration, $d^4U/d\theta^4$, is 0 at $\theta = 90°$, since the slope of the acceleration, $d^3U/d\theta^3 = 0$ at $\theta = 90°$ for all values of $E_1$ and $E_2$. Therefore, from equation (23):

$$-E_1 - 81E_2 = 0 \qquad (26)$$

The second relationship may be generated by again "forcing" the displacement to pass through 0 at an angle $\theta = \theta_{N_{23}}$ whereupon the displacement has a triple 0; i.e., $U = 0$ at $\theta = -\theta_{N_3}, 0,$ and $\theta_{N_3}$. This second relationship then becomes:

$$\theta_{N_3} - E_1 \sin \theta_{N_3} + E_2 \sin 3 \theta_{N_3} = 0 \qquad (27)$$

When equations (26) and (27) are solved for various values of $\theta_{N_3}$, specific values of $E_1$ and $E_2$ are found to satisfy both equations. Several illustrative solutions to equations (26) and (27) are presented in the table below:

| Assigned Value | Coefficients | | Curve |
|---|---|---|---|
| $\theta_{N_3}$ | $E_1$ | $E_2$ | |
| 4° | .965293 | −.011917 | FIG. 29 |
| 6° | .966553 | −.011933 | |
| 8° | .968319 | −.011955 | $B_1$ |
| 10° | .970592 | −.011983 | |
| 12° | .973375 | −.012017 | $B_2$ |
| 14° | .976670 | −.012058 | |
| 16° | .980481 | −.012105 | $B_3$ |
| 18° | .984810 | −.012158 | |
| 20° | .989663 | −.012218 | |

As noted in the table above, three sets of these coefficients were utilized in equation (19) to calculate the curves $B_1$, $B_2$ and $B_3$ in FIG. 29. It will be noted that the dwell characteristics are markedly inferior to those attainable in the maximum dwell configuration, but still usable in many practical applications.

The relative velocity characteristics of this configuration are presented by curve B in FIG. 30. Only one curve is presented since the difference in the velocity characteristics when using any pair of coefficients from the table above is very small. It will be noted that the relative velocity reaches a maximum value of 2, which is the same as the "Ref." curve and curve A representing the maximum dwell configuration.

The relative acceleration characteristics of this configuration are presented as curve B in FIG. 31. As expected, the peak acceleration is lower than either curve A (by 47%) or Ref. curve (by 15%).

The change in sign of the eccentricity $E_2$ indicates that the movement component created by the eccentricity, $E_2$ is in the opposite direction from that shown in FIG. 28. One way this may be accomplished is by changing the initial position of $E_2$ to be diametrically opposite that shown in FIGS. 23 and 28. Therefore, the initial starting position of the system when operating under these conditions is shown in FIG. 32 which is substantially identical with FIG. 14.

In both of the applications described above, the kinematic diagrams were predicted on the condition that the eccentricities $E_1$ and $E_2$ were rotating in the same direction. This is the case if sprocket 66A and 20A are chain connected as shown in FIG. 22, or if they are replaced by gears having one intermediate idler gear interposed (or an odd number of interposed intermediate idlers). If, however, the interconnecting drive between shafts 54 and 22 is such that shafts 54 and 22 rotate in opposite directions, the kinematic diagrams will change, but the results will be the same; but this is only true as long as the effect of the oscillation of axis $A_2$ about $A_1$ is ignored. The initial starting condition for the maximum dwell mode and opposite rotation of shafts 54 and 22 is shown in FIG. 33 which is substantially identical with FIG. 15; the initial starting conditions for the minimum peak acceleration mode and opposite rotation of shafts 54 and 22 is shown in FIG. 34 which is substantially identical with FIG. 16.

It will be noted by comparing FIGS. 12 and 30 and FIGS. 13 and 31 that the addition of a second harmonic (or other "even" harmonics) can be utilized to influence the position and amplitude of the maximum acceleration point and the amplitude of the midstroke velocity whereas the addition of the third harmonic (or other "odd" harmonic) can be utilized to influence the amplitude only of the maximum acceleration (its position is at the 90° or quarter point of the cycle) and the shape of the velocity curve which always reaches the same midpoint velocity.

While the creation of an improved dwell or reduced peak acceleration are practically of the greatest significance relative to this system, other variations and combinations are possible. In essence, it is possible to achieve or approximate any movement profile which may be mathematically constructed using harmonic synthesis based on the first and third harmonics. This specifically includes non-symmetrical conditions created by a phase shift between the first and third harmonics as represented by the equation:
ti $U = \theta - E_1 \sin \theta + E_2 \sin (3 \theta + \phi)$ where $\phi$ is the phase shift angle.

In the foregoing analyses, the oscillation of axis $A_2$ about axis $A_1$ was omitted to simplify the conceptual presentation. However, the values of $E_1$ and $E_2$ obtained in these simplified analyses are fair approximations to those found for the complete system. Furthermore, the basic "framework" of the analysis may be carried forward to the completely rigorous analyses in which the oscillation of axis $A_2$ about axis $A_1$ is included. For example, to find these conditions where a maximum dwell is attained, the concept of "forcing" the displacement to go through 0 five times is still valid. Techniques dependent on differentiation are of little value because, as will be seen, many of the relationships are of such complexity as to make differentiation impractical.

FIG. 35 is a kinematic line drawing of the mechanism at a position representing the center of the dwell for the maximum dwell mode in which the eccentricities $E_1$ and $E_2$ rotate in the same direction. FIG. 35 is substantially the same as FIG. 17 (there are only slight differences in scale) and the variables defined in connection with FIG. 17 are also applicable to FIG. 35.

It may be seen that the values of the dependent variables may again be calculated from the assigned variables according to the following formulas:

$$\alpha_o = \sin^{-1}\left(\frac{E_1 \cos \theta_o - \delta - E_2 \cos \psi_o}{L_1}\right) \quad (28)$$

$$\beta_o = \theta_o - \alpha_o + 90° \quad (29)$$

$$X_o = E_1 \sin \theta_o + L_1 \cos \alpha_o - E_2 \sin \psi_o \quad (30)$$

which are identical with equations (9), (10) and (11).

FIG. 36 is a kinematic line drawing of the mechanism after the eccentricity $E_2$ has rotated through an angle 3 $\psi_N$ from its initial position to reach a new position at which the new angles and distances reached are as follows:

$\psi = \psi_O + 3\psi_N =$ angle between $E_2$ and a line perpendicular to pitch line of rack $\theta =$ Angle between $E_1$ and a line perpendicular to pitch line of rack $\alpha =$ Angle between $L_1$ and a line parallel to pitch line of rack $\beta =$ Angle between $L_1$ and $E_1$ $X =$ Distance from axis $A_0$ to $A_3$ along a line parallel to rack pitch line $U =$ Movement of rack from its initial position in FIG. 35

It must be noted that the rotation of $E_1$ relative to $L_1$ to about $A_1$ causes a rotation of $E_2$ relative to $L_1$ about $A_2$ due to the 3:1 drive ratio between them because of sprockets 66A and 20A and interconnection chain 68 or equivalent. Now, if $\alpha = \alpha_o$, then $\theta - \theta_o = \psi_N$; however, ordinarily $\alpha \neq \alpha_o$ and an iterative technique must be used to evaluate $\theta$ for a given $\psi_N$.

FIG. 37 is a kinematic drawing showing the effect of a change in the angle $\alpha$ on the angle $\theta$. This must be superimposed on the relationship $\theta - \theta_N = \psi_N$. From FIG. 37, $\theta - \theta_o = 2/3 (\alpha - \alpha_o)$.

Therefore:

$$\theta - \theta_o = \psi_N + 2/3 (\alpha - \alpha_o)$$

or $$\theta = \theta_o + \psi_N + 2/3 (\alpha - \alpha_o) \quad (31)$$

From FIG. 36, it may be seen that:

$$\alpha = \sin^{-1}\left(\frac{E_1 \cos \theta - \delta - E_2 \cos (\psi_o + 3\psi_N)}{L_1}\right) \quad (32)$$

Equations (31) and (32) must be iterated to find a unique value of $\theta$ for each specified value of $\psi_N$. This is most easily done by assuming $\alpha = \alpha_o$ in equation (31) calculating $\theta$, substituting in (32), and calculating a new $\alpha$; this is then used in (31) and the entire process repeated until the values of $\alpha$ and $\theta$ satisfy both equations.

With $\theta$ so established, the value X may be calculated from FIG. 36.

$$X = E_1 \sin \theta + L_1 \cos \alpha - E_2 \sin \psi \quad (33)$$

The output movement U, due to a rotation of $E_2$ through an angle $3\psi N$ is seen to be:

$$U = \theta - \theta_o - (X - X_o) \quad (34)$$

If the two angles at which the mechanism is to have zero output movement are defined as $\psi_{N_1}$ and $\psi_{N_2}$, the foregoing technique permits the calculation of the actual output movements, at those angles, which are defined as $U_{N_1}$ and $U_{N_2}$, respectively, and it is the object of this analysis to find those conditions which result in $U_{N_1} = 0$ and $U_{N_2} = 0$. There are, however, four conditions or input variables which may be varied to achieve $U_{N_1} = U_{N_2} = 0$ and a multiplicity of solutions must exist.

Accordingly, using the simplified analysis as a guide, an additional restraint is placed on the system, which is that at the initial point, the output acceleration being 0. This is very closely approximated by imposing the following relationships:

$\theta_o = \psi_o$ $\beta_o = 90°$ from which $\alpha_o = \theta_o$. (from equation 29).

Substituting into equation (28) and simplifying $$(E_1 - E_2) \cos \theta_o - L_1 \sin \theta_o = \delta \quad (35)$$

$\theta_o$ may be determined from equation (35) and this same value assigned to $\alpha_o$ and $\psi_o$. Now only two unknowns remain: $E_1$ and $E_2$. For a first analysis $E_1$ and $E_2$ are assigned the values found from the simplified analysis which were 1.125 and 0.04167 respectively. $\theta_o$, $\alpha_o$ and $\psi_o$ are found from equation (35).

For the first angle $\psi_{N_1}$, the corresponding $U_{N_1}$ is calculated as described above; similarly, for the second angle $\psi_{N_2}$, the corresponding $U_{N_2}$ is calculated.

These values of $U_{N_1}$ and $U_{N_2}$ are in effect errors which it is intended to eliminate. Therefore, it is hypothesized that these errors are created by an error function of the form:

$U_E = G_1 \sin Q + G_2 \sin 3 Q$

Since at $Q = \psi_{N_1}$, $U_E = U_{N_1}$ $$U_{N_1} = G_1 \sin \psi_{N_1} + G_2 \sin 3 \psi_{N_1} \quad (36)$$

And since at $Q = \psi_{N_2}$, $U_E = U_{N_2}$ $$U_{N_2} = G_1 \sin \psi_{N_2} + G_2 \sin 3 \psi_{N_2} \quad (37)$$

Equations (36) and (37) may be solved to find distinct values of $G_1$ and $G_2$ which are the coefficients of a hypothetical function which generates the same errors as those found in the actual mechanism. Since the magnitude of the fundamental component in the actual mechanism is related to the magnitude of $E_1$ a corrected value of $E_1$ is found by subtracting $G_1$ from the originally assumed value of $E_1$, i.e., $E_1$ (corrected) = $E_1$ (original) + $G_1$ Similarly, $E_2$ (corrected) = $E_2$ (original) − $G_2$ The corrected values of $E_1$ and $E_2$ are now used to calculate new values of $\theta_o$, $\alpha_o$ and $\psi_o$ and the entire calculation procedure repeated to find new values of $U_{N_1}$ and $U_{N_2}$ which are found to be significantly smaller than those based on the original values of $E_1$ and $E_2$; $G_1$ and $G_2$ are also recalculated and $E_1$ and $E_2$ recorrected. This procedure may be repeated until the values of $U_{N_1}$ and $U_{N_2}$ become arbitrarily small. It is found that the solution converges quite rapidly. A programmable calculator or computer is a great convenience, but not an absolute necessity in these calculations.

Using the technique described above and assuming the following input parameters:

$L_1 = 3$
$\delta = 0$
$\psi_{N_1} = 26°$
$\psi_{N_2} = 42°$ the following results were obtained:

$E_1 = 1.12501$
$E_2 = 0.5781$
$\theta_o = \psi_o = 19.5822°$

When these values were utilized to calculate the displacement over a range of values of the input angle $\psi$, curve $C_1$ in FIG. 38, was obtained. It will be understood that in this case, the term "primary rotation" means the rotation of the input eccentricity away from its null position (as defined by $\psi_o$), divided by three. It will be noted that curve $C_1$ leaves the graph at $-19°$. It may be seen, therefore, that while the curve $C_1$ crosses the axis at $\psi = 0°$, 26° and 42° as intended, the displacement in the range of negative values of $\psi$ is not attractive.

To correct this deficiency, it becomes necessary to modify one of the original parameter assumptions from $\theta_o = \psi_o$ to $\theta_o = \psi_o + \epsilon$ where $\epsilon$ is some small angle which is in effect a phase shift between the eccentricities $E_1$ and $E_2$. The null diagram shown in FIG. 35 is still valid but it will be understood that now $\theta_o = \psi_o + \epsilon$ Equation (35) now becomes:

$$E_1 \cos \theta_o - E_2 \cos (\theta_o - \epsilon) - L_1 \sin \theta_o - \delta \quad (35a)$$

from which $\theta_o$ may be determined.

The remainder of the technique remains unaltered and when an $\epsilon$ of $-3°$ is assumed with the other input parameters unaltered ($L_1 = 3$, $\delta = 0$, $\psi_{N_1} = 26°$, $\psi_{N_2} = 42°$), the following results were obtained:

$E_1 = 1.09317$
$E_2 = 0.05021$
$\theta_o = 16.4892$
$\psi_o = 19.4892$

When these values were utilized to calculate the displacement over a range of values of the input angle $\psi$, the curve $C_2$ in FIG. 38 was obtained. It will be noted that while this curve also passes through 0 at 0, 26° and 42°, its behavior at negative values of $\psi$ is just the opposite of that found for $C_1$ ($\epsilon = 0$).

A new phase shift angle is now assumed: $\epsilon = -2°$. This gives rise to the curve $C_3$ in FIG. 38. A still newer phase shift angle of $\epsilon = -1.9°$ is now assumed which is the basis of curve $C_4$ in FIG. 39. (FIG. 39 is presented to avoid congestion in FIG. 38.) A marked improvement in the displacement characteristics for negative values of $\psi$ is to be noted.

By visual interpolation between curves $C_3$ ($\epsilon = -2°$) and $C_4$ ($\epsilon = -1.9°$), a value of $-1.95°$ was assigned to $\epsilon$; this yields the final results:

$E_1 = 1.10377$
$E_2 = 0.05284$
$\theta_o = 17.5713$
$\psi_o = 19.5213$

When these values were used to calculate the displacement over a range of $\psi$, the curve $C_5$ in FIG. 39 was obtained. It will be noted that the characteristics in the negative region are substantially similar to those in the positive region and that it is indeed possible to find a practical solution to the system which causes the displacement to cross "0" five times, thereby creating a practical dwell of considerable proportions. In this case, the mechanism displacement output lies within a band of $\pm 0.0013$ (relative to 6.28 total stroke) for 82° or more than one-fifth of the input cycle which is excellent for many practical applications.

The calculating technique outlined above is obviously involved and laborious. However, after a family of related solutions is found, it is possible to relate new assumptions to existing solutions to make convergence quite rapid. This technique is presented as an example that works to achieve the desired characteristics. Other systems of curve fitting may be utilized with equal validity.

Comparable techniques are available to find combinations of $E_1$, $E_2$, $\theta_o$ and $\psi_o$ which result in low peak accelerations. Under these conditions, the dwell characteristics are compromised within the framework established by the simplified solutions, in which the effect of the movement of axis $A_2$ about axis $A_1$ was temporarily ignored.

By extrapolation, it may be seen that both the mechanical and mathematical techniques described above for second harmonic addition systems and for third harmonic addition systems may be extended to higher harmonic systems of the order N where N is an integer greater than 1. Such a system of order N would have an output movement which is a superposition of a substantially constant velocity component created by the angular movement of the gear 16, plus a fundamental or once per cycle oscillation of the axis $A_3$ as axis $A_2$ and $A_3$ rotate about each other, plus an Nth harmonic or N per cycle oscillation created by the rotation of axis $A_1$ about axis $A_o$, plus the effect created by the oscillation of axis $A_2$ about $A_1$. Such systems are all also inherently reversible.

An important variation of this linear output drive system is illustrated in FIGS. 40 and 41. In this case, the entire drive system is mounted on the pivoted bracket and the driving torque is supplied on axis $A_2$.

In this case, a frame 80 supports a riser bracket 82 in which is mounted a crankshaft 84 rotating in bearings 86 on a fixed axis $A_0$. An eccentric portion of the shaft 88 rotates on a moving axis $A_1$ and supports a pivoted bracket 90 through bearings 92. A gear reducer 94 is mounted on the pivoted bracket 90 and is driven by an input pulley 96, belt 98, and pulley 100 on drive motor 102. The output shaft of the gear reducer 94 has attached to it a sprocket 104 which rotates on the axis $A_2$; this sprocket 104 in turn drives a sprocket 106 mounted on shaft 88 rotating on axis $A_1$ through a drive chain 108. The drive gear 16 is mounted eccentrically on sprocket 104 through spacer 109; the drive gear 16 again rotates on the axis $A_3$. It will be understood that the drive gear 16 is again in mesh with the gear rack 14 as in FIG. 1 and that the axis $A_3$ of the gear 16 is again maintained at a constant distance from the pitch line of the gear rack 14 through spacer 30 and its associated details.

For a second harmonic addition embodiment the ratio between sprocket 104 and 106 is 1 to 2 as shown, i.e., the sprocket 104 makes one revolution while sprocket 106 makes two revolutions, while for a third harmonic addition embodiment the ratio between sprocket 104 and 106 is 1 to 3, i.e., the sprocket 104 makes one revolution while sprocket 106 makes three revolutions; by extension a system having Nth harmonic addition is achieved by making the aforesaid ratio of 1 to N.

The mathematical techniques for evaluating the distance $E_1$ from axis $A_2$ to $A_3$ and the distance $E_2$ from axis $A_0$ to axis $A_1$ remain substantially the same as in the previous examples. However, the dynamic behavior of the output will be modified since in this embodiment it is the angle $\beta$ which is changing at a constant rate with respect to time, whereas in the embodiment of FIGS. 1, 2, 3, 4, and 22, it is the angle $\psi$ which is changing at a constant rate with respect to time. The angle $\beta$ is shown in FIGS. 18 and 36 as the angle between the line connecting axes $A_1$ and $A_2$ and the line connecting the axes $A_2$ and $A_3$.

A third embodiment of a linear output system is illustrated in FIGS. 42, 43 and 44. In this instance, the rack and gear output connection is replaced with a chain and sprocket. A base 120, through a riser 126, supports a gear reducer 122 driven by a motor 124. The base 120 further supports two brackets 128 and 130 in which an output bar 132 may be reciprocated as supported and guided by rollers 134.

A saddle assembly consisting of plate 136, spacer 138, and plate 140 is supported and guided on the output bar 132 through rollers 142. The plate 136 supports two idler sprockets 144 through suitable bearings; additionally, the plate 136 supports a drive sprocket 146 mounted through bearings 148 on stub shaft 150. Accordingly, sprocket 146 rotates on an axis $A_3$. A drive chain 152 suitably formed to engage sprockets 144 and 146 is attached at its ends to the output bar 132 through anchor blocks 154 and 156; the path of the chain 152 is clearly evident in FIG. 42.

The sprocket 146 is connected eccentrically through a spacer 158 to a sprocket 160. Sprocket 160 is mounted on a shaft 162 which rotates in bearings 164 on an axis $A_2$; the bearings 164 are housed in the outboard end of a pivoted arm 166 (FIG. 43). The other end of the arm 166 is connected through bearings 168 to an eccentric shaft 170 rotating on a moving axis $A_1$. The shaft 170 in turn is mounted eccentrically to the output shaft 172 of the gear reducer 122; the shaft 172 rotating on a fixed axis $A_0$ (FIG. 44). A sprocket 174 is mounted on and rotates with the shaft 170; sprocket 174 drives sprocket 160 through chain 176 (FIG. 42) with a 2:1 ratio, i.e., sprocket 174 rotates through two complete revolutions while sprocket 160 rotates through one revolution.

This embodiment is the exact kinematic equivalent to the embodiment of FIGS. 1, 2, 3 and 4. The index stroke of the output bar 132 is equal to the pitch circumference of the sprocket 146; this sprocket being the equivalent of the drive gear 16 of FIG. 1. It can be seen that as the shaft 172 makes two revolutions about axis $A_0$, the sprocket 160 makes one revolution about axis $A_2$ and sprocket 146 makes one revolution about axis $A_3$, while axis $A_3$ oscillates along a line parallel to the output bar 132 and axis $A_2$ oscillates at substantially right angles to the path of the output bar 132, and axes $A_2$ and $A_3$ rotate about each other.

The specific proportions and ratios shown in FIGS. 42, 43 and 44 are again for a second harmonic addition system. However, by merely changing the ratio of sprocket 174 to sprocket 170 from 2:1 to 3:1, a third harmonic addition system is achieved. In either case, the eccentricities between axes $A_0$ and $A_1$ and between axes $A_2$ to $A_3$ must be set to the values determined for the characteristics desired. Similarly, the aforesaid ratio may be made N:1 for the addition of the Nth harmonic.

A fourth embodiment of a linear output system is presented in FIGS. 45, 46 and 47. Whereas in the previous three embodiments the output member moved along a substantially fixed line, in this embodiment, the output rack moves along a line which oscillates relative to the frame; accordingly, the oscillation required of the pivoted bracket or arm is substantially reduced.

Referring to FIGS. 45, 46 and 47, a base 180 supports a gear reducer 182 through a riser 184; the gear reducer 182 is driven by motor 186 through coupling 188. The output shaft 190 of the reducer 182 rotates on an axis $A_0$ and has mounted on it an eccentric shaft 192 rotating on an axis $A_1$. A pivoted arm 194 is connected to shaft 192 through a bearing 196. The other end of arm 194 is connected to a shaft 198 through a bearing 200 (FIG. 46). The shaft 198 in turn is supported through bearings 202 in an oscillating bracket 204 pivotally connected to the base 180 through stub shafts 206, bearings 208, and brackets 210. The bracket 204 is therefore free to oscillate about the fixed axis $A_5$ as driven by the arm 194.

A sprocket 213 mounted on shaft 192 drives a sprocket 214 mounted on shaft 198 through a chain 216 with a 2:1 ratio; i.e., for each two revolutions of sprocket 213 on axis $A_1$ the sprocket 214 is driven through one revolution on axis $A_2$. It can be seen, therefore, that during the interval that the sprocket 214 and shaft 198 make one revolution on axis $A_2$, the axis $A_2$ oscillates through two complete cycles in a substantially horizontal plane about fixed axis $A_5$, with the amplitude of this oscillation determined by the eccentricity of axis $A_1$ relative to the fixed axis $A_0$.

A drive gear 212 is mounted on shaft 198 through an eccentric support bracket 215; gear 212 rotates on an eccentric axis $A_3$. A gear rack 216 is suitably formed to mesh with gear 212; this gear rack 216 is pivotally connected to an output link 218 through a pin 220, the link 218 being supported from the base 180 through a pivot pin 222, and a bracket 224. The output drive arm 226 is connected to the output link 218 through a pin 228; the other end of the arm 226 is connected to the load to be driven.

The gear rack 216 is held in proper mesh with the gear 212 through a guide assembly consisting of bearings 230 mounted in gear 212, shaft 232 mounted in bearings 230 on axis $A_3$, spacer plate 234, and guide rollers 236 rotating on shafts 238 mounted on plate 234.

It may be seen, therefore, that as the gear 212 rotates about axis $A_3$, axis $A_3$ rotates about the oscillating axis $A_2$, thereby imparting to the gear rack 216 a fundamental or first harmonic motion in addition to the second harmonic generated by the motion of axis $A_2$. As the gear 212 rotates, the pitch line contact with gear rack 216 moves up and down causing the gear rack to oscillate about pin 220.

The foregoing description of FIGS. 45, 46 and 47 again refers to a second harmonic addition system. To achieve a third harmonic addition system the ratio from sprocket 213 to sprocket 214 is made 3:1 rather than 2:1 as shown; and for an Nth harmonic addition system this ratio is made N:1.

Kinematically, the characteristics of this embodiment are very similar to those of the previous systems. The simplified analyses outlined above apply equally well. However, the rigorous analysis is slightly modified within the same conceptual framework.

A variation of the pivoted rack system in the fourth embodiment is presented in FIGS. 48, 49 and 50. Here the higher harmonic is not generated at the input end of the system but is introduced through the fulcrum axis of the output drive link. This link, therefore, in addition to performing a function of coupling the gear rack to the output load, becomes an adder which combines the fundamental or first harmonic output of the gear rack with the higher harmonic generated through its fulcrum connection to the base.

Referring to FIGS. 48, 49 and 50, a base 250 supports a spacer 252 on which are mounted a gear reducer 254 and a motor 256 which drives the gear reducer 254 through a coupling 257.

One end of the output shaft 258 of the gear reducer 254 supports an eccentric mounting plate 260 on which is mounted a gear 262. It will be noted that the shaft 258 rotates on a stationary axis $A_2$ while the gear rotates on the moving axis $A_3$, thereby revolving about axis $A_2$. A gear rack 264 is formed to mesh with the gear 262 and is maintained in pitch line contact with gear 262 by rollers 266, rotating on shafts 268 mounted in spacer plate 270; the plate 270 in turn is related to gear 262 by a shaft 272 mounted thereon and rotating in bearings 274 mounted concentrically in gear 262 on axis $A_3$.

The rack 264 is connected to a lever 276 through shaft 278; the lower end of lever 276 is pivoted through bearings 280 on eccentric shaft 282. The upper end of lever 276 is connected by shaft 284 to link 286 whose other end is pivot connected to the output load of the system.

The shaft 282 on axis $A_1$ is mounted on eccentric plate 288 which in turn is mounted on shaft 290. Shaft 290 rotates on a fixed axis $A_0$ in bearings 292 mounted in brackets 294 mounted on the base 250. The shaft 290 is driven by sprocket 295 and chain 296 from a sprocket 197 mounted on the output shaft 258 of the gear reducer 254.

The chain 296 is suitably formed to mesh with sprockets 295 and 297 and sprocket 297 has a pitch diameter N times that of sprocket 295. Therefore, as the gear reducer output shaft 258 rotates on fixed axis $A_2$ at some angular velocity, it causes shaft 290 to rotate on axis $A_0$ at N times that angular velocity.

It can be seen, therefore, that the shaft 282 will rotate eccentrically on axis $A_1$ about axis $A_2$. Since shaft 282 is the fulcrum for the lever 276 an oscillating component of motion is superimposed on the output motion which is at N times the frequency of the fundamental motion generated by the gear 262, rack 264 combination. This system, therefore, will generate essentially the same output motion characteristics as the previous embodiments with suitable ratios and eccentricities.

Each of the embodiments described above for linear systems is inherently reversible as noted with respect to FIGS. 1 to 9. For each embodiment, the reverse stroke is accomplished by simply reversing the input shaft. During a reverse stroke, the kinematic characteristics calculated for a forward stroke merely change sign.

In all the foregoing analyses and descriptions, the mechanism provided for an output along a substantially straight line. The mechanism is equally adaptable to generate an output motion along a curvilinear line or as a rotary movement about a fixed axis. The output member may be an external gear or an internal gear; or it may be a sprocket arranged to rotate in the same direction or in the opposite direction as the rotation of the input sprocket.

The embodiment in which the output member is an external gear is presented in FIGS. 51, 52 and 53. An input shaft 300 rotates on a fixed axis $A_0$ in bearings 302 housed in a bracket 304 mounted on a frame 306. The shaft is driven by a sprocket 308 which in turn is driven by a chain 310 from some suitable prime mover. An eccentric shaft 312 is made integral with or rigidly attached to shaft 300; shaft 312 rotates on an eccentric axis $A_1$ and supports a pivoted arm 314 through bearings 316. The other end of the pivoted arm 314 supports a shaft 318 in bearings 320. Shaft 318 rotates on an axis $A_2$ and is driven by a sprocket 321, mounted thereon, through a chain 322 from a sprocket 324 mounted on shaft 312. The drive ratio from sprocket 321 to sprocket 324 is 2:1 for a second harmonic addition system as shown or this drive ratio is made 3:1 for a third harmonic addition system, i.e., sprocket 324 makes two or three revolutions on axis $A_1$ while sprocket 321 makes one revolution on axis $A_2$. It is easily seen that the Nth harmonic may be superimposed by making the aforesaid ratio N to 1.

Shaft 326 is mounted to shaft 318 through an eccentric spacer 328; shaft 326 rotates on an axis $A_3$ and supports a drive gear 330 which also rotates on axis $A_3$. Drive gear 330 is suitably formed to mesh with an output gear 332 which rotates on a fixed axis $A_4$. Output gear 332 is mounted on a shaft 334 mounted in bearings 336 housed in the frame 306.

The gear 330 is maintained in proper driving relationship with gear 332 through a link 338 which at one end is connected to shaft 334 through bearing 340 and its other end is connected to shaft 326 through bearing 342.

The embodiment in which the output member is an internal gear is presented in FIGS. 54, 55 and 56. An input shaft 350 rotates on a fixed axis $A_0$ in bearings 352 housed in a bracket 354 mounted on a frame 356. The shaft 350 is driven by a sprocket 358 mounted thereon driven by a chain 360 from some suitable prime mover. An eccentric shaft 362 is rigidly connected to shaft 350 or made integral therewith; shaft 362 rotates on the eccentric axis $A_1$. A pivoted arm 364 is mounted from shaft 362 through bearings 366; at its other end arm 364 supports a shaft 368 rotating on axis $A_2$ in bearings 370 housed in arm 364. A sprocket 372 mounted on shaft 372 drives a sprocket 374 mounted on shaft 368 through a chain 376 through a 2:1 ratio as shown for a second harmonic addition system or this ratio may be made for a 3:1 ratio for a third harmonic addition system. Thus, during two or three revolutions of the sprocket 372, the sprocket 374 is driven through a single revolution. Again, the Nth harmonic may be added by making the ratio between sprocket 372 and sprocket 374 N to 1.

A stub shaft 378 is rigidly and eccentrically attached to the shaft 368 through a plate 380; shaft 378 rotates on an axis $A_3$ and has mounted thereon a drive gear 382. The drive gear 382 meshes with an output internal gear 384 which rotates on a fixed axis $A_4$. The gear 384 is mounted on a shaft 386 which rotates in bearings 388 housed in the frame 356.

The gear 283 is maintained in proper driving relationship with the gear 384 through a link 390 which is connected at one end to shaft 386 through bearing 392 and at its other end link 390 is connected to shaft 378 through bearing 394.

It will be understood that the kinematic characteristics of the rotary output mechanisms illustrated in FIGS. 33, 34 and 35 and FIGS. 36, 37 and 38 will be substantially similar to the mechanism of FIGS. 1, 2, 3, 4 and 22. In the case of the external gear output system, a slight variation occurs because the axis $A_3$ oscillates on a slightly convex arc rather than a straight line; while in the case of the internal gear output system, a slight variation occurs because the axis $A_3$ oscillates on a slightly concave arc. The rigorous kinematic analyses required for each case will be similar to and will follow the exact techniques established for the mechanism having a straight line output. It will be further understood that the output "stroke" of these rotary output systems will be the movement generated by one revolution of the drive gear rotating on axis $A_3$.

It can be seen that for both rotary embodiments described above, the driving connection between the shaft rotating on axis $A_1$ to the shaft rotating on axis $A_2$ may be a system of gears rather than chains and sprockets. The only criterion is that the shaft on axis $A_1$ make N revolutions for each revolution of the shaft on axis $A_2$. While there is a difference in kinematic behavior, the shaft on axis $A_2$ may rotate in the opposite direction to that of the shaft on axis $A_1$.

The mechanism illustrated in FIGS. 57, 58 and 59 is the exact kinematic equivalent to the internal gear output mechanism shown in FIGS. 54, 55 and 56; the output connection from the member rotating on axis $A_3$ to the output member rotating on the fixed axis $A_4$ is through a chain and sprockets rather than gears.

Referring to FIGS. 57, 58 and 59, a gear reducer 400 is mounted on a frame 402 and driven by a suitable motor 404. The output shaft 406 of the gear reducer 400 rotates on a fixed axis $A_0$ and rigidly supports an eccentric shaft 408 rotating on the eccentric axis $A_1$.

The output shaft 410 rotates on a fixed axis $A_4$ in bearings 412 housed in a bracket 414 mounted on the frame 402. The shaft 410 suppports a link 416 through bearings 418; at its other end, the link 416 in turn supports a shaft 429 through bearings 422. The shaft 420 rotates on axis $A_3$; sprocket 424, mounted on shaft 420, drives the output sprocket 426 mounted on shaft 410 through a chain 428. Shaft 420 in turn is eccentrically mounted on and driven by sprocket 430 rotating on the axis $A_2$. A shaft 432 is concentrically connected to sprocket 430, and arm 434 is connected between shaft 432 and shaft 408 by bearings 436 and 438 respectively. Sprocket 430 is driven by sprocket 440 on shaft 408 through the chain 442. The drive ratio between sprocket 440 and sprocket 430 is again shown as 2:1, i.e., the sprocket 440 makes two revolutions on axis $A_1$ while driving sprocket 430 through one revolution on axis $A_2$, thereby creating second harmonic addition. If the ratio between sprocket 440 and 430 is made 3:1, a third harmonic addition system results or if the ratio is made N:1, an Nth harmonic addition system is created.

The embodiment illustrated in FIGS. 60, 61 and 62 is the kinematic equivalent of the mechanism shown in FIGS. 51, 52 and 53; the output connection from the member rotating on axis $A_3$ to the output member rotating on the fixed axis $A_4$ is through a chain and sprocket rather than gears.

Referring to FIGS. 60, 61 and 62, a gear reducer 450 is mounted on a frame 452 and driven by a suitable motor 454. The output shaft 456 of the gear reducer 450 rotates on a fixed axis $A_0$ and rigidly supports an eccentric shaft 458 rotating on the eccentric axis $A_1$.

The output shaft 460 rotates on a fixed axis $A_4$ in bearings 462 housed in a bracket 464 mounted on the frame 452. The shaft 460 supports a link 466 through bearings 468; at its other end, the link 466 in turn supports a shaft 470 through bearings 472; shaft 470 rotates on axis $A_3$ and has mounted thereon a sprocket 474. Two idler sprockets 476 are mounted on shafts 477 which rotate in bearings 478 housed in link 466 on either side of the axis $A_3$. A chain 480 passing around idler sprockets 476 is driven by sprocket 474 and in turn drives the output sprocket 482 mounted on shaft 460. Shaft 470 is eccentrically mounted on and driven by sprocket 484 rotating on the axis $A_2$. A shaft 486 is concentrically connected to sprocket 484 and arm 488 is connected between shaft 486 and shaft 458 by bearings 490 and 492, respectively. Sprocket 484 is driven by sprocket 494 mounted on shaft 458 through the chain 496. The drive ratio between sprocket 494 and sprocket 484 is again 2:1, i.e., the sprocket 494 makes two revolutions on axis $A_1$ while driving sprocket 484 through one revolution on axis $A_2$, once again creating a second harmonic addition system. As before, if this drive ratio is made 3:1 or N:1, a third harmonic addition or Nth harmonic addition system results.

In each of the four embodiments illustrating the mechanism when employed to provide a rotary output, the input power or torque was introduced to the shaft rotating on the fixed axis $A_0$. It is evident that it is equally possible to introduce the power or torque to the shaft rotating on axis $A_2$ or to the shaft rotating on axis $A_3$. In these cases, the motor and its associated gear reducer must be mounted on a moving link which may be advantageous in some applications.

It will further be noted that in these rotary output embodiments the angular movement of the output member is again a superposition of four movement components which are: a constant movement created by the angular rotation of the driving member on axis $A_3$, a fundamental or once per cycle oscillation created by the rotation of axis $A_3$ about axis $A_2$, a higher harmonic component created by the rotation of axis $A_1$ about axis $A_0$, and a variable component created by the oscillation of axis $A_2$ about axis $A_1$.

In all of the embodiments described above, that portion of the mechanism which generated the higher harmonic addition was always shown as being generated by an eccentric axis $A_1$ moving about an axis $A_0$ stationary with respect to the frame. This need not be the case. It is equally possible to generate the higher harmonic component between the pair of moving axes, while the fundamental component is generated by a pair of axes of which one is stationary.

An illustrative mechanism is shown in FIGS. 63, 64 and 65. This mechanism is an inversion of the mechanism shown in FIGS. 54, 55 and 56 which employs a pinion gear driving an internal output gear.

Referring to the FIGS. 63, 64 and 65, an input shaft 500 rotates on a fixed axis $A_0$ in bearings 502 housed in a bracket 504 mounted on a frame 506. The shaft 500 is driven by a sprocket 508 mounted thereon by a chain 510 from some suitable prime mover. An eccentric cheekplate 511 is rigidly attached to shaft 500 and in turn rigidly supports an eccentric shaft 512 which rotates on an eccentric axis $A_1$. This assembly of shaft 500, plate 511 and shaft 512 may be made from one piece as a manufacturing convenience. A pivoted arm 514 is mounted from the shaft 512 through bearings 516; at its other end, arm 514 supports a shaft 518 rotating on an axis $A_2$ in bearings 520 housed in arm 514. A sprocket 522 mounted on the shaft 512 drives a sprocket 524 mounted on the shaft 518 through a chain 526 through a N:1 ratio, i.e., during one revolution of the sprocket 522, the sprocket 524 is driven through N revolutions (two to 1 is shown). It will be noted that in terms of mechanical components, the mechanism is substantially the same as that shown in the embodiment of FIGS. 54, 55 and 56 except that the sprocket ratio is inverted.

A stub shaft 528 is rigidly and eccentrically attached to the shaft 518 through a plate 530; shaft 528 rotates on an axis $A_3$ and has mounted thereon a drive gear 532. The drive gear 532 meshes with an output terminal gear 534 which rotates on a fixed axis $A_4$. The gear 534 is mounted on a shaft 536 which rotates in bearings 538 housed in the frame 506. It will again be noted that in this embodiment the distances between axes $A_0$ and $A_1$ and between $A_2$ and $A_3$ are substantially interchanged relative to those distances shown in the embodiment of FIGS. 54, 55 and 56.

The gear 532 is maintained in proper driving relationship with the gear 534 through a link 540 which is connected at one end to shaft 536 through bearing 542 and at its other end link 540 is connected to shaft 528 through bearing 544.

The kinematic output capabilities of this embodiment are substantially identical with those of the embodiment of FIGS. 54, 55 and 56. Whereas in the embodiment of FIGS. 54, 55 and 56 the first harmonic or fundamental component of the output movement was generated by the rotation of axis $A_3$ about $A_2$, and the higher harmonic component was generated by the rotation of axis $A_1$ about $A_0$; in the embodiment of FIGS. 63, 64 and 65, these functions are inverted, i.e., the first harmonic or fundamental component of the output movement is generated by the rotation of axis $A_1$ about $A_0$ while the higher harmonic is generated by the rotation of axis $A_3$ about axis $A_2$ and a total output cycle requires N revolutions of the gear 532.

While the two embodiments are substantially alike in terms of mechanical components, there is a functional difference to be noted.

It is obvious that this same type of inversion may be employed with respect to all the other embodiments, i.e., the positions in the mechanism which generate the first and higher harmonic components may be interchanged. For some applications, this may be of considerable value, an example being that situation where large output index angles are desired and there is limited space for the gear in contact with the output gear.

As previously noted, all embodiments share common mechanical and kinematic properties wherein the output motion is the result of the superposition of four movement components which are: a substantially constant motion created by the rotation of a member about an axis $A_3$; an oscillating motion created by rotation of axis $A_3$ about an axis $A_2$; another oscillating motion of an axis $A_1$ about a fixed axis $A_0$ at a frequency two times, three times, or N times, greater than that of axis $A_3$ about $A_2$; and a complex motion created by the oscillation of interconnecting links.

Also, as previously noted for linear systems, all rotary output embodiments are inherently reversible, again by reversing the direction of rotation of the input shaft, with all kinematic characteristics changing sign with a change of the direction of input shaft rotation.

Where repetitive unidirectional output cycles are generated, it is important that the ratio of rotation of axis $A_1$ about $A_0$ be exactly two to one or three to one to the rotation of axis $A_3$ about $A_2$. Otherwise, an increasing phase shift would appear after each cycle or cumulative error. This type of usage is typical of but not limited to the rotary output embodiments.

Where reciprocating outputs are desired as is typical of, but not limited to, linear output embodiments, this ratio of the rotation of axis $A_1$ about axis $A_0$ to the rotation of axis $A_3$ about $A_2$ need not be exactly integral but may vary within an approximate range of $\pm 20\%$. Such variations must, of course, be recognized in the practice mathematical analysis. However, in reciprocating type applications, the cumulative phase shifts do not arise.

I claim:

1. A reversible and cyclically repetitive indexing system incorporating a substantially linear, first harmonic and higher harmonic components to achieve a variety of kinematic objectives comprising:
   (a) a frame,
   (b) a main output member supported by said frame for movement along a predetermined path,
   (c) a first rotating pair supported by said frame comprising:
      (1) a first rotating member mounted for rotation in said frame,
      (2) a first eccentric member mounted eccentrically, in non-rotational relation to, and on said first rotating member,
   (d) a second rotating pair mounted in fixed spatial relationship with said first rotating pair comprising:
      (1) a second rotating member,
      (2) a second eccentric member mounted eccentrically in non-rotational relation to, and on said second rotating member,
   (e) means connecting for rotation said first rotating pair and said second rotating pair for substantially integral angular velocity ratio,
   (f) means connecting said main output member with said first eccentric member and with said second eccentric member comprising:
      (1) a first output member in tangential driving engagement with the periphery of one of said eccentric members,
      (2) a second output member rotatably mounted to the other of said eccentric members, and
   (g) power means connected to one of said rotating pairs to impact a rotary motion to that said rotating pair.

2. A reversible and cyclically repetitive indexing system incorporating a substantially linear, first harmonic and second harmonic components to achieve a variety of kinematic objectives comprising:
   (a) a frame,
   (b) a main output member supported by said frame for movement along a predetermined path,
   (c) a first rotating pair supported by said frame comprising:
      (1) a first rotating member mounted for rotation in said frame,
      (2) a first eccentric member mounted eccentrically, in non-rotational relation to, and on said first rotating member,
   (d) a second rotating pair mounted in fixed spatial relationship with said first rotating pair comprising:
      (1) a second rotating member,
      (2) a second eccentric member mounted eccentrically in non-rotational relation to, and on said second rotating member,
   (e) means connecting for rotation said first rotating pair and said second rotating pair for substantially two to one angular velocity ratio,
   (f) means connecting said main output member with said first eccentric member and with said second eccentric member comprising:
      (1) a first output member in tangential driving engagement with the periphery of one of said eccentric members,
      (2) a second output member rotatably mounted to the other of said eccentric members, and
   (g) power means connected to one of said rotating pairs to impart a rotary motion to that said rotating pair.

3. A reversible and cyclically repetitive indexing system incorporating a substantially linear, first harmonic and third harmonic components to achieve a variety of kinematic objectives comprising:
   (a) a frame,
   (b) a main output member supported by said frame for movement along a predetermined path,
   (c) a first rotating pair supported by said frame comprising:
      (1) a first rotating member mounted for rotation in said frame,
      (2) a first eccentric member mounted eccentrically, in non-rotational relation to, and on said first rotating member,
   (d) a second rotating pair mounted in fixed spatial relationship with said first rotating pair comprising:
      (1) a second rotating member,
      (2) a second eccentric member mounted eccentrically in non-rotational relation to, and on said second rotating member,
   (e) means connecting for rotation said first rotating pair and said second rotating pair for substantially three to one angular velocity ratio,
   (f) means connecting said main output member with said first eccentric member and with said second eccentric member comprising:
      (1) a first output member in tangential driving engagement with the periphery of one of said eccentric members,
      (2) a second output member rotatably mounted to the other of said eccentric members, and
   (g) power means connected to one of said rotating pairs to impart a rotary motion to that said rotating pair.

4. A reversible and cyclically repetitive indexing system incorporating a substantially linear, first harmonic and higher harmonic components to achieve a variety of kinematic objectives comprising:
(a) a frame,
(b) a main output member supported by said frame for movement along a predetermined path,
(c) a first rotating pair supported by said frame comprising:
  (1) a first rotating member,
  (2) a second rotating member mounted eccentrically, in non-rotational relation to, and on said first rotating member,
(d) a second rotating pair mounted in fixed relationship with said first rotating pair comprising:
  (1) a third rotating member,
  (2) a fourth rotating member mounted eccentrically, in non-rotational relation to, and on said third rotating member,
(e) means mounting said first rotating pair and said second rotating pair in a fixed spatial relationship,
(f) means connecting for rotation said first rotating pair with said second rotating pair in an angular velocity ratio of substantially integral value,
(g) means connecting said main output member with said first rotating pair and with said second rotating pair comprising:
  (1) a first output member in tangential driving engagement with one of said rotating members of said second rotating pair,
  (2) a second output member rotatably mounted on said second rotating member, and
(h) power means connected to one of said rotary pairs to impart a rotary motion to said rotary pair.

5. A reversible and cyclically repetitive indexing system incorporating a substantially linear, first harmonic, and higher harmonic components to achieve a variety of kinematic objectives comprising:
(a) a frame,
(b) a main output member supported by said frame for movement along a predetermined path,
(c) a first rotating pair supported by said frame comprising:
  (1) a first rotating member rotating about a first axis,
  (2) a second rotating member eccentrically mounted on said first rotating member and rotating about a second axis non-coincident with said first axis,
(d) a second rotating pair mounted in fixed relationship with said first rotating pair comprising:
  (1) a third rotating member rotating about a third axis,
  (2) a fourth rotating member eccentrically mounted on said third rotating member and rotating about a fourth axis non-coincident with said third axis,
(e) means mounting one of said rotating members of said first rotating pair in fixed spatial relationship with one of said rotating members of said second rotating pair,
(f) means connecting one of said rotating members of said first rotating pair with one of said rotating members of said second rotating pair for rotation wherein said first rotating pair rotates at an angular velocity substantially an integral multiple of the angular velocity of said second rotating pair,
(g) means connecting said main output member with said first rotating pair and with said second rotating pair comprising:
  (1) a first output member in tangential driving engagement with one of said rotating members of one of said rotating pairs,
  (2) a second output member rotatably mounted to one of said rotating members of the other of said rotating pairs, and
(h) power means connected to one of said rotating pairs to impart a driving torque to that said rotating pair.

6. A reversible and cyclically repetitive indexing system incorporating a substantially linear, first harmonic, and higher harmonic components to achieve a variety of kinematic objectives comprising:
(a) a frame,
(b) a main output member supported by said frame for movement along a predetermined path,
(c) a first rotating pair supported by said frame comprising:
  (1) a first rotating member rotating about a first axis,
  (2) a first eccentric member mounted in non-rotational relation to and on said first rotating member, with the center of said first eccentric member non-coincident with said first axis,
(d) a second rotating pair mounted in fixed relationship with said first rotating pair comprising:
  (1) a second rotating member rotating about a second axis,
  (2) a second eccentric member mounted in non-rotational relation to and on said second rotating member, with the center of said second eccentric member non-coincident with said second axis,
(e) means mounting said first rotating pair and said second rotating pair in a fixed relative spatial relationship,
(f) means connecting for rotary motion said first rotating pair with said second rotary pair wherein said first rotary pair rotates at an angular velocity substantially an integral multiple of the angular velocity of said second rotary pair,
(g) means connecting said main output member with said first eccentric member and with said second eccentric member comprising:
  (1) a first output member in tangential driving engagement with the periphery of one of said eccentric members,
  (2) a second output member rotatably mounted to the other of said eccentric members, and
(h) power means connected to one of said rotating pairs to impart a rotating motion to that said rotating pair.

7. A reversible and cyclically repetitive indexing system incorporating a substantially linear, first harmonic, and higher harmonic components to achieve a variety of kinematic objectives comprising:
(a) a frame,
(b) an output member supported by said frame for movement along a predetermined path,
(c) a first rotating pair supported by said frame comprising:
  (1) a first rotating member rotating about a first axis,
  (2) a first eccentric member mounted in non-rotational relation to and on said first rotating member, with the center of said first eccentric member non-coincident with said first axis,
(d) a second rotating pair mounted in fixed relationship with said first rotating pair comprising:

(1) a second rotating member rotating about a second axis, (2) a second eccentric member mounted in non-rotational relation to and on said second rotating member, with the center of said second eccentric member non-coincident with said second axis, (e) means mounting said first rotating pair and said second rotating pair in a fixed relative spatial relationship, (f) means connecting for rotary motion said first rotating pair with said second rotary pair wherein said first rotary pair rotates at an angular velocity subtantially an integral multiple of the angular velocity of said second rotary pair, (g) means connecting by superposition said output member with said first rotating pair and with said second rotating pair comprising:

(1) a tangential drive member in tangential driving engagement with one of said eccentric members, (2) an intermediate oscillating link rotatably mounted on the other of said eccentric members, (3) means mounted between said tangential drive member and said intermediate oscillating link, and (h) power means connected to one of said rotating pairs to impart a rotating motion to that one of said rotating pairs.

8. A reversible and cyclically repetitive indexing system incorporating a substantially linear, first harmonic, and higher harmonic components to achieve a variety of kinematic objectives comprising:

(a) a frame, (b) an output member having a driven portion and supported by said frame for movement along a predetermined path, (c) a first rotating pair supported for rotation by said frame comprising:

(1) a first rotating member mounted for rotation in said frame, (2) a first eccentric member mounted eccentrically, in non-rotational relation to, and on said first rotating member, (d) a second rotating pair mounted in fixed spatial relationship to said first rotating pair comprising:

(1) a second rotating member, (2) a second eccentric member mounted eccentrically, in non-rotational relation to, and on said second rotating member, (e) means mounting said second rotating member to said first eccentric member in a fixed relative spatial relationship, (f) means connecting for rotary drive motion said second rotating member and said first eccentric member in a substantially integral multiple angular velocity ratio, (g) means connecting said second eccentric member with said driven portion of said output member for tangential drive therebetween, and (h) power means connected to one of said rotating pairs to impart a rotary motion to that said rotating pair.

9. A reversible and cyclically repetitive indexing system incorporating a substantially linear, first harmonic, and higher harmonic components to achieve a variety of kinematic objectives comprising:

(a) a frame, (b) an output member supported by said frame for movement along a predetermined path, (c) a first rotating pair supported by said frame comprising:

(1) a first rotating member mounted for rotation in said frame, (2) a first eccentric member mounted eccentrically, in non-rotational relation to, and on said first rotating member, (d) an oscillating support member mounted on said frame for movement in a direction substantially parallel to the path of said output member, (e) a second rotating pair mounted for rotation in said oscillating support member and comprising:

(1) a second rotating member, (2) a second eccentric member mounted in non-rotational relation to, eccentric with, and on said second rotating member and adapted for tangential drive at its periphery, (f) means pivotally mounted at one end to said first eccentric member and pivotally connected at its other end to said second rotating member, (g) means connecting for rotation said first eccentric member and said second rotating member in a substantially integral multiple angular velocity ratio, (h) a rack member suitably adapted for and in tangential driving engagement with said second eccentric member, (i) means connecting said rack member with said second eccentric for substantially constant pitch line contact therebetween, (j) means mounting said rack member to said frame for complex movement predominately parallel to said path of said output member, and (k) power means connected to one of said rotating members to impart a rotary motion to that said rotating member.

10. A reversible and cyclically repetitive indexing system incorporating a substantially linear, first harmonic, and higher harmonic components to achieve a variety of kinematic objectives comprising:

(a) a frame, (b) an output member supported by said frame for movement along a predetermined path, (c) a first rotating pair supported by said frame comprising:

(1) a first rotating member mounted for rotion in said frame, (2) a first eccentric member mounted in non-rotational relation to, eccentric with, and on said first rotating member, and adapted for tangential drive at its periphery, (d) a second rotating pair supported by said frame comprising:

(1) a second rotating member mounted for rotation in said frame, (2) a second eccentric member mounted in non-rotational relation to, eccentric with, and on said second rotating member, (e) means connecting for rotation said first rotating member and said second rotating member in a substantially integral multiple angular velocity ratio, (f) a rack member suitably adapted for and in tangential driving engagement with said first eccentric member, (g) means connecting said rack member with said first eccentric member for substantially constant pitch line contact therebetween, (h) link means mounted on said second eccentric member at a first pivot point, (i) means pivotally mounting said rack member to said link means at a second pivot point spaced from said first pivot point, (j) means pivotally connecting said output member to said link means at a third pivot point spaced from said first and second pivot points, and (k) power means connected to one of said rotating pairs to impart a rotary motion to that said rotating member.

11. A reversible and cyclically repetitive indexing system incorporating a substantially linear, first harmonic, and higher harmonic components to achieve a variety of kinematic objectives comprising:

(a) a frame, (b) an output member supported by said frame for movement in a substantially linear path, (c) a first rotating pair supported by said frame comprising:
  (1) a first rotating member mounted for rotation in said frame,
  (2) a first eccentric member mounted eccentrically, in non-rotational relation to, and on said first rotating member, (d) a first guide member rotatably mounted on said first eccentric member on a first eccentric axis, (e) a second rotating pair comprising:
  (1) a second rotating member mounted for rotation in said first guide member on an axis displaced from said first eccentric axis,
  (2) a second eccentric member mounted eccentrically, in non-rotational relation to, and on said second rotating member, (f) means connecting for rotation said first eccentric member and said second rotating member in a substantially integral multiple angular velocity ratio, (g) means connecting for tangential driving engagement said output member and said second eccentric member, and (h) power means connected to one of said rotating pairs to impart a rotating motion to that said rotating pair.

12. A reversible and cyclically repetitive indexing system incorporating a substantially linear, first harmonic, and higher harmonic components to achieve a variety of kinematic objectives comprising:

(a) a frame, (b) an output member adapted for tangential drive and supported by said frame for rotation, p1 (c) a first rotating pair supported by said frame comprising:
  (1) a first rotating member mounted for rotation in said frame,
  (2) a first eccentric member mounted eccentrically, in non-rotational relation to, and on said first rotating member, (d) a first guide member rotatably mounted on said first eccentric member on a first eccentric axis, (e) a second rotating pair comprising:
  (1) a second rotating member mounted for rotation in said first guide member on an axis displaced from said first eccentric axis,
  (2) a second eccentric member mounted eccentrically, in non-rotational relation to, and on said second rotating member, (f) means connecting for rotation said first eccentric member and said second rotating member in a substantially integral multiple angular velocity ratio, (g) means rotatably connecting said output member and said second eccentric member in a fixed spatial relative relationship, (h) means connecting for rotation said output member and said second eccentric member in a tangential drive relationship, and (i) power means connected to one of said rotating pairs to impart a rotating motion to that said rotating pair.

13. A reversible and cyclically repetitive indexing system incorporating a substantially linear, first harmonic, and higher harmonic components to achieve a variety of kinematic objectives comprising:

(a) a frame, (b) an output member having a driven rack portion and supported by said frame for movement in a substantially linear path, (c) a first rotating pair supported by said frame comprising:
  (1) a first rotating member mounted for rotation in said frame,
  (2) a first eccentric member mounted eccentrically, in non-rotational relation to, and on said first rotating member, (d) a first guide means rotatably mounted on said first eccentric member for rotation about a first eccentric axis, (e) a second rotating pair mounted on said first guide means comprising:
  (1) a second rotating member mounted for rotation in said first guide means to rotate about an axis in a fixed spatial relationship with said first eccentric axis,
  (2) a second eccentric member mounted eccentrically, in non-rotational relation to, and on said second rotating member and having peripheral gear teeth formed for engagement with said rack portion of said output member, (f) means connecting for rotation said first eccentric member and said second rotating member in a substantially integral multiple angular velocity ratio, (g) second guide means movably connecting said second eccentric member with said output member for substantially constant pitch line contact between said gear teeth and said rack portion of said output member, and (h) power means connected to one of said rotating pairs to impart a rotating motion to that said rotating pair.

14. A reversible and cyclically repetitive indexing system incorporating a substantially linear, first harmonic, and higher harmonic components to achieve a variety of kinematic objectives comprising:

(a) a frame, (b) an output member supported by said frame for movement in a substantially linear path, (c) flexible drive means mounted to said output member, (d) a first rotating pair supported by said frame comprising:
  (1) a first rotating member mounted for rotation in said frame,
  (2) a first eccentric member mounted eccentrically, in non-rotational relation to, and on said first rotating member, (e) a first guide means mounted for relative rotation on said first eccentric member for rotation about a first eccentric axis, (f) a second rotating pair mounted on said first guide means comprising:
  (1) a second rotating member mounted for rotation in said first guide means to rotate about an axis in a fixed spatial relationship with said first eccentric axis,
  (2) a second eccentric member mounted eccentrically, in non-rotational relation to, and on said second rotating member and having a peripheral drive surface formed for engagement with said flexible drive means,
(g) means connecting for rotation said first eccentric member and said second rotating member in a substantially integral multiple angular velocity ratio,
(h) second guide means rotatably connected to said second eccentric member and movable along a path substantially parallel to said path of said output member, and
(i) power means connected to one of said rotating pairs to impart a rotating motion to that said rotating pair.

15. A reversible and cyclically repetitive indexing system incorporating a substantially linear, first harmonic, and higher harmonic components to achieve a variety of kinematic objectives comprising:
(a) a frame,
(b) an output gear member rotatably supported by said frame,
(c) a first rotating pair supported by said frame comprising:
  (1) a first rotating member mounted for rotation in said frame,
  (2) a first eccentric member mounted eccentrically, in non-rotational relation to, and on said first rotating member,
(d) a first guide means mounted for relative rotation on said first eccentric member for rotation about a first eccentric axis,
(e) a second rotating pair mounted on said first guide means comprising:
  (1) a second rotating member mounted for rotation in said first guide means to rotate about an axis in fixed spatial relationship with said first eccentric axis,
  (2) a second eccentric member mounted eccentrically, in non-rotational relation to and on said second rotating member and having peripheral gear teeth suitably formed to mesh with said output gear member,
(f) means connecting for rotation said first eccentric member and said second rotating member in a substantially integral multiple angular velocity ratio,
(g) second guide means rotatably connecting said second eccentric member and said output gear member in a fixed relative spatial relationship for substantially constant pitch line contact between said members, and
(h) power means connected to one of said rotating pairs to impart a rotary motion to that said rotating pair.

16. A reversible and cyclically repetitive indexing system incorporating a substantially linear, first harmonic, and higher harmonic components to achieve a variety of kinematic objectives comprising:
(a) a frame,
(b) an output member rotatably supported by said frame and having a peripheral drive surface,
(c) a first rotating pair supported by said frame comprising:
  (1) a first rotating member mounted for rotation in said frame,
  (2) a first eccentric member mounted eccentrically, in non-rotational relation to, and on said first rotating member,
(d) a first guide means mounted for relative rotation on said first eccentric member for rotation about a first eccentric axis,
(e) a second rotating pair mounted on said first guide means comprising:
  (1) a second rotating member mounted for rotation on said first guide means to rotate about an axis in fixed spatial relationship with said first eccentric axis,
  (2) a second eccentric member mounted eccentrically, in non-rotational relation to, and on said second rotating member and having a peripheral drive surface compatible with said peripheral drive surface of said output member,
(f) means connecting for rotation said first eccentric member and said second rotating member in a substantially integral multiple angular velocity ratio,
(g) second guide means rotatably connecting said second eccentric member and said output member in a fixed relative spatial relationship,
(h) flexible drive means connecting said second eccentric member and said output member suitably formed to engage the peripheral drive surfaces of said second eccentric member and said output member, and
(i) power means connected to one of said rotating pairs to impart a rotary motion to that said rotating pair.

* * * * *